USOO5523374A

United States Patent [19]
Bard et al.

[11] Patent Number: 5,523,374
[45] Date of Patent: Jun. 4, 1996

[54] CURABLE AND CURED ORGANOSILICON COMPOSITIONS

[75] Inventors: John K. Bard; Richard L. Brady, both of Wilmington; Raymond T. Leibfried, Newark; De K. Loo, Hockessin, all of Del.

[73] Assignee: Hercules Incorporated, Wilmington, Del.

[21] Appl. No.: 141,653

[22] Filed: Oct. 26, 1993

Related U.S. Application Data

[63] Continuation-in-part of Ser. No. 983,450, Dec. 3, 1992, Pat. No. 5,391,678.
[51] Int. Cl.[6] ............................ C08G 77/04; C08G 77/12
[52] U.S. Cl. ................................ 528/26; 528/27; 528/28; 528/29; 528/31
[58] Field of Search ................................ 528/27, 31, 29, 528/28, 26

[56] References Cited

U.S. PATENT DOCUMENTS

| 2,946,701 | 7/1960 | Plueddemann et al. | 428/391 |
|---|---|---|---|
| 2,970,150 | 1/1961 | Bailey | 549/215 |
| 2,997,458 | 8/1961 | Lewis | 528/27 |
| 3,055,858 | 9/1962 | Frye et al. | 528/15 |
| 3,131,161 | 4/1964 | Nitzsche et al. | 523/435 |
| 3,170,962 | 2/1965 | Tyler | 525/524 |
| 3,197,432 | 7/1965 | Lamoreaux | 528/31 |
| 3,197,433 | 7/1965 | Lamoreaux | 528/31 |

(List continued on next page.)

FOREIGN PATENT DOCUMENTS

| 1256821 | 4/1989 | Canada . |
| 2075469 | 9/1991 | Canada . |
| 80/00847A1 | 5/1980 | European Pat. Off. . |
| 479310 | 3/1990 | European Pat. Off. . |
| 0415243 | 3/1991 | European Pat. Off. . |
| 0469890A3 | 2/1992 | European Pat. Off. . |
| 482404 | 4/1992 | European Pat. Off. . |
| 1520015 | 7/1969 | Germany . |
| 3738634A1 | 11/1987 | Germany . |
| 53-046349 | 4/1978 | Japan . |
| 1113455 | 5/1989 | Japan . |
| 2274719 | 11/1990 | Japan . |
| 202524 | 7/1965 | U.S.S.R. . |

OTHER PUBLICATIONS

Crivello et al., "The synthesis, Characterization, and Photoinitiated Cationic Polymerization of Silicon–Containing Epoxy Resins", *Journal of Polymer Science: Part A: Polymer Chemistry* vol. 28, pp. 479–503 (1990), discussed at p. 10, lines 19–23 of the application.

Crivello et al,. "Regioselective Ring–Opening Polymerizations and Hydrosilations Catalyzed by Transition Metals", *Macromol. Chem. Macromol. Symp.*, 54/55, pp. 189–198 (1992), discussed at p. 11, lines 13–16 of the application.

Crivello et al., "Regioselective Rhodium–Containg Catalysts for Ring–Opening Polymerizations and Hydro–silylations", *Journal of Polymer Science: Part A: Polymer Chemistry*, vol. 30, pp. 1–11 (1992), discussed.

Crivello et al., "Novel Platinum–Containing Initiators for Ring–Opening Polymerizations", *Journal of Polymer Science: Part A: Polymer Chemistry*, vol. 29, pp. 1853–1863 (1991), discussed at p. 14, lines 7–10.

English Language Abstracts of Japanese Patent No. 1–113455.

English Language Abstracts of Japanese Patent No. 2–274719.

English Language Abstracts of Japanese Patent No. 53–46349.

Chemical Abstracts, 87874p, vol. 68, p. 8492, 87874p (1968), for U.S.S.R. Patent No. 202,524.

Crivello et al., "Catalysis of Ring–Opening and Vinyl Polymerizations by Dicobaltoctacarbonyl", *Journal of Polymer Science: Part A: Polymer Chemistry*, vol. 30, pp. 31–39 (1992).

Crivello et al., "Novel Platinum Inititators for Ring–Opening Polymerization", *Polymer Preprints*, vol. 32, pp. 338–339 (1991).

Crivello et al., "Regioselective Ring–Opening Polymerizations Catalyzed by Transition Metal Complexes", pp. 340–341.

Crivello et al., "The UV Cure of Epoxy–Silicone Monomers", *Polymer Materials Science & Engineering*, vol. 60, pp. 217–221 (1989).

Eckberg et al., "Ultraviolet Cure of Epoxysiloxanes and Epoxysilicones", *Polymer Materials Science & Engineering*, vol. 60, pp. 222–227 (1989).

English Language Derwent Abstract for European Patent Appliation No. 0,179,355.

Dr. John K. Bard; Silicon–Carbon Resins to Boost PWB Use; Jun. 1992 pp. 45–46; p. 48.

Drs. John K. Bard & Richard L. Brady; A New Moisture REsistant Liquid Encapsulant; 1992; pp. 1018–1022.

J. K. Bard, R. L. Brady & J. M. Schwark; Processing and Properties of Silicon–Carbon Liquid Encapsulants.

Drs. John K. Bard & Richard L. Brady; A New Moisture–Resistant Liquid Encapsulant; May 1992; pp. 1–5.

Drs. John K. Bard & Julia S. Burnier; I. New Low Dielectric Constant, Moisture Resistant Resin Technology For High Speed/High Frequency Circuit Board Applications.

(List continued on next page.)

*Primary Examiner*—John C. Bleutge
*Assistant Examiner*—Karen A. Dean
*Attorney, Agent, or Firm*—Robert P. O'Flynn O'Brien; Mark D. Kuller

[57] ABSTRACT

Curable compositions including epoxy-functional compounds and polyenes, as well as cyclic polysiloxanes, and/or tetrahedral siloxysilanes, and/or linear polysiloxanes; along with, or instead of these polyenes and silicon compositions, crosslinkable prepolymers prepared from such polyenes and silicon compounds may be included. A curing agent, and yet additionally, a curing accelerator, may also be included. These compositions can be thermally cured, in the presence of hydrosilation catalysts.

28 Claims, No Drawings

U.S. PATENT DOCUMENTS

| | | | |
|---|---|---|---|
| 3,220,972 | 11/1965 | Lamoreaux | 528/15 |
| 3,223,577 | 12/1965 | Plueddemann | 428/428 |
| 3,296,153 | 1/1967 | Snogren | 428/117 |
| 3,438,936 | 4/1969 | Lamoreaux | 528/31 |
| 3,516,964 | 6/1970 | Patterson | 528/33 |
| 3,577,263 | 5/1971 | Nordstrom | 428/447 |
| 3,779,988 | 12/1973 | Rembold et al. | 528/25 |
| 3,868,342 | 2/1975 | Magne | 523/425 |
| 3,971,747 | 7/1976 | Bank et al. | 523/435 |
| 4,046,930 | 9/1977 | Johnson et al. | 427/387 |
| 4,083,856 | 4/1978 | Mendicino | 260/348.12 |
| 4,279,717 | 7/1981 | Eckberg et al. | 522/31 |
| 4,291,144 | 9/1981 | Takago | 528/26 |
| 4,293,678 | 10/1981 | Carter | 528/32 |
| 4,370,358 | 1/1983 | Hayes et al. | 427/515 |
| 4,421,904 | 12/1983 | Eckberg et al. | 528/27 |
| 4,547,431 | 10/1985 | Eckberg | 428/413 |
| 4,576,999 | 3/1986 | Eckberg | 525/476 |
| 4,640,967 | 2/1987 | Eckberg | 528/26 |
| 4,652,618 | 3/1987 | Sumida et al. | 525/478 |
| 4,673,718 | 6/1987 | Ryntz et al. | 525/476 |
| 4,754,014 | 6/1988 | Ryntz et al. | 528/28 |
| 4,804,768 | 2/1989 | Quirk et al. | 549/215 |
| 4,847,154 | 7/1989 | Ryang | 428/415 |
| 4,877,820 | 10/1989 | Cowan | 523/222 |
| 4,900,779 | 2/1990 | Leibfried | 524/862 |
| 4,902,731 | 2/1990 | Leibfried | 523/222 |
| 4,912,188 | 3/1990 | Colas et al. | 528/15 |
| 4,954,580 | 9/1990 | Zahir | 525/476 |
| 4,966,981 | 10/1990 | Takai et al. | 549/215 |
| 4,977,198 | 12/1990 | Eckberg | 522/25 |
| 4,987,158 | 1/1991 | Eckberg | 522/31 |
| 4,990,546 | 2/1991 | Eckberg | 522/170 |
| 5,008,360 | 4/1991 | Bard et al. | 528/25 |
| 5,010,118 | 4/1991 | Desorcie et al. | 522/31 |
| 5,013,809 | 5/1991 | Leibfried, Sr. | 524/862 |
| 5,025,048 | 6/1991 | Burnier | 524/99 |
| 5,037,861 | 8/1991 | Crivello et al. | 522/172 |
| 5,057,358 | 10/1991 | Riding et al. | 428/209 |
| 5,068,303 | 11/1991 | Bard et al. | 528/25 |
| 5,077,134 | 12/1991 | Leibfried, Sr. | 428/447 |
| 5,086,124 | 2/1992 | Fukuyama et al. | 525/403 |
| 5,118,735 | 6/1992 | Burnier | 524/99 |
| 5,124,375 | 6/1992 | Leibfried | 523/222 |
| 5,124,423 | 6/1992 | Leibfried | 528/15 |
| 5,128,431 | 7/1992 | Riding et al. | 528/15 |
| 5,147,945 | 9/1992 | Leibfried et al. | 525/475 |
| 5,171,817 | 12/1992 | Barnum et al. | 528/15 |

OTHER PUBLICATIONS

Drs. John K. Bard & Julia S. Burnier; II. New Low Dielectric Constant, Moisture Resistant Resin Technology For High Speed/High Frequency Circuit Board Applications.

Polyclad Laminates, Inc; PCL–511; Laminates and Prepregs for High Speed Digital Applications.

Research Disclosure; Phosphorus Based Catalyst Retardants For Silicon–Carbon Resin Systems; Jun. 1991.

Research Disclosure; Organosilicon Composition Containing Hydrocarbon Elastomer; Oct. 1991; pp. 799–800.

Research Disclosure; Liquid Encapsulants, Flip Chip Encapsulants and Die Attach Adhesives; Mar. 1992; pp. 184–187.

Research Disclosure; Platinum(II) Complexes As Catalysts For Silicon–Carbon Resin Systems; May 1992; pp. 355–357.

Research Disclosure; Transfer Molding Compounds for Encapsulation; Sep. 1992 pp. 707–709.

Chemical Abstracts, ¶193004r, p. 9, vol. 188 (1993) for Japanese Patent Publication No. 04,261,461, Published Sep. 17, 1992.

CURABLE AND CURED ORGANOSILICON COMPOSITIONS

CONTINUING APPLICATION DATA

This application is a continuation-in-part of U.S. Ser. No. 983,450, Dec. 3, 1992, U.S. Pat. No. 5,391,678, which is incorporated herein in its entirety, by reference thereto.

BACKGROUND OF THE INVENTION

1. Field of the Invention

The present invention relates to novel curable and cured organosilicon compositions, and to processes for preparing these compositions.

3. Description of Background and Other Information

LEIBFRIED '779, U.S. Pat. No. 4,900,779, LEIBFRIED '731, U.S. Pat. No. 4,902,731, LEIBFRIED '134, U.S. Pat. No. 5,077,134, and BARD et al. '360, U.S. Pat. No. 5,008,360, describe crosslinked organosilicon polymers and crosslinkable organosilicon prepolymers comprised of alternating polycyclic hydrocarbon residues and cyclic polysiloxanes or siloxysilane residues linked through carbon to silicon bonds; these patents are incorporated herein in their entireties, by reference thereto. COWAN, U.S. Pat. No. 4,877,820, also incorporated herein in its entirety, by reference thereto, discloses crosslinkable and crosslinked linear poly(organohydrosiloxane) prepolymers and polymers having at least 30% of their hydrosilation reactive $\equiv$SiH groups reacted with hydrocarbon residues derived from polycyclic polyenes.

It has been discovered that the incorporation of epoxy-functional compounds—as well as epoxy-functional compounds together with curing agents, and epoxy-functional compounds together with both curing agents and curing accelerators—with crosslinkable prepolymers such as those discussed above, and in the preparation of crosslinked polymers, such as those discussed above, provides, to the cured compositions, mechanical properties that are superior to the properties which result when such components are not present. The improved mechanical properties include higher modulus, lower thermal expansion, and better adhesion.

SUMMARY OF THE INVENTION

The present invention pertains, in a first embodiment, to a curable composition comprising a polyene, a silicon compound, and a compound comprising at least one epoxy functionality, and, optionally, at least one hydrosilation reactive double bond. The polyene has at least two hydrosilation reactive carbon-carbon double bonds, while the silicon compound has at least two hydrosilation reactive $\equiv$SiH groups, and comprises at least one member selected from the group consisting of cyclic polysiloxanes, linear polysiloxanes, and tetrahedral siloxysiloxanes; further, at least one, of the polyene and the silicon compound, has more than two hydrosilation reactive sites.

The invention further pertains, in a second embodiment, to a curable composition comprising a curing agent, as well as the indicated silicon and epoxy-functional compounds. Here, the epoxy-functional compound has the at least one hydrosilation reactive carbon-carbon double bond.

In this second embodiment, the silicon compound has at least two hydrosilation reactive $\equiv$SiH groups. As a variation of this second embodiment, the indicated silicon and epoxy-functional compounds are provided, to the curable composition, as the hydrosilation product of these two reactants, in the form of an epoxy-substituted silicon compound.

In a third embodiment, the invention pertains to a curable composition which comprises a polyene, as previously discussed, and an epoxy-substituted silicon compound, as provided immediately above, but which is only partially epoxy-substituted. Here, the amount of the epoxy-functional compound is sufficient only for partial hydrosilation of the silicon compound hydrosilation reactive $\equiv$SiH groups.

The present invention further pertains, in yet a fourth embodiment, to a curable composition comprising a crosslinkable organosilicon prepolymer, and the compound comprising at least one epoxy functionality, and with or without the at least one hydrosilation reactive double bond. Preferred such crosslinkable organosilicon prepolymers comprise the hydrosilation reaction products of the polyene and silicon compound, also as discussed above.

The present invention further pertains to a cured composition, resulting from subjecting a curable composition, according to one of the foregoing embodiments, to conditions suitable for effecting hydrosilation, and/or ring opening polymerization, and providing crosslinking—e.g., crosslinking of the polyene and silicon compound (in the first embodiment), or crosslinking of the prepolymer (in the fourth embodiment), as well as effecting ring opening polymerization of the compound comprising at least one epoxy functionality.

The invention still additionally pertains to a process of preparing a cured composition, from a blend comprising a curable composition, according to one of the foregoing embodiments—e.g., comprising polyene and silicon compound (in the first embodiment), or the prepolymer (in the fourth embodiment), as well as the compound comprising at least one epoxy functionality, and yet further, a hydrosilation catalyst. In this process, the blend is subjected to conditions suitable for effecting hydrosilation, and/or ring opening polymerization, and providing crosslinking—e.g., crosslinking, or at least substantial crosslinking—of the polyene and silicon compound (in the first embodiment), or of the crosslinkable prepolymer (in the fourth embodiment), as well as effecting ring opening polymerization of the compound comprising at least one epoxy functionality.

DESCRIPTION OF THE INVENTION

The term "polyene," as used herein, refers to molecules having at least two carbon-carbon double bonds.

The term "polymer," as used herein, may encompass prepolymers, such as crosslinkable prepolymers, and polymers, such as crosslinked polymers.

The term "prepolymer", as used herein, refers to any liquid or solid hydrosilation crosslinkable composition that has been partially cured, but has not been cured up to or beyond its gel point (gel point is the point at which a material will no longer flow when heated, and is no longer soluble in organic solvents); typically, having 5% to 80% of the available $\equiv$SiH groups reacted, and, in the case of the poly (organohydrosiloxane) prepolymers, as discussed hereinafter, up to 90% of such groups reacted.

The term "crosslinked polymer", as used herein, encompasses the products of curing hydrosilation crosslinkable compositions, as discussed above with reference to the term "prepolymer", up to or beyond such gel point. This term further encompasses crosslinked polymers, as well as at least substantially crosslinked polymers.

The term "crosslinking", as used herein, particularly in the context of the process of the invention, encompasses the effecting of full crosslinking, as well as the effecting of at least substantial crosslinking.

The polyenes suitable for the invention include those having at least two hydrosilation reactive carbon-carbon double bonds. Preferred among such polyenes are the polycyclic polyenes, including those as disclosed in LEIBFRIED '779, LEIBFRIED '731, BARD et al. '360, and LEIBFRIED '809, U.S. Pat. No. 5,013,809, this last patent being incorporated herein in its entirety, by reference thereto.

Particular appropriate polycyclic polyenes are polycyclic hydrocarbon compounds having at least two non-aromatic carbon-carbon double bonds in their rings. Exemplary compounds include cyclopentadiene oligomers (e.g., dicyclopentadiene, tricyclopentadiene, and tetracyclopentadiene), bicycloheptadiene (i.e., norbornadiene) and its Diels-Alder oligomers with cyclopentadiene (e.g., dimethanohexahydronaphthalene), norbornadiene dimer, hexahydronaphthalene; also suitable are substituted derivatives of the cyclopentadiene oligomers, including substituted derivatives of any of the foregoing oligomers—e.g., methyl dicyclopentadienes. Dicyclopentadiene (also referred to herein as DCPD) is preferred. Two or more polycyclic polyenes can be used in combination.

The silicon compounds of the invention include those cyclic polysiloxanes, tetrahedral siloxysilanes, and linear polysiloxanes with two or more hydrogen atoms bound to silicon—particularly, with at least two hydrosilation reactive ≡SiH groups. Two or more suitable silicon compounds can be used in combination; particularly, one or more such cyclic polysiloxanes, and/or one or more such tetrahedral siloxysilanes, and/or one or more such linear polysiloxanes, may be employed.

Suitable such silicon compounds include those disclosed in LEIBFRIED '779, LEIBFRIED '731, LEIBFRIED '134, LEIBFRIED '809, COWAN, and BARD et al. '360, and in LAMOREAUX '432, U.S. Pat. No. 3,197,432, LAMOREAUX '433, U.S. Pat. No. 3,197,433, and LAMOREAUX '936, U.S. Pat. No. 3,438,936. These latter three patents are incorporated herein in their entireties, by reference thereto.

Appropriate cyclic polysiloxanes include those having the general formula:

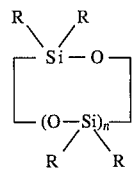

wherein R, which can be the same or different, is hydrogen, or a saturated, substituted, or unsubstituted alkyl or alkoxy radical, or a substituted or unsubstituted aromatic or aryloxy radical, n is an integer from 2 to about 20, and R is hydrogen on at least two of the silicon atoms in the molecule.

The methylhydrocyclosiloxanes (also referred to herein as MHCS), and mixtures thereof, are suitable such cyclic polysiloxanes. Examples include, e.g., tetraoctyl cyclotetrasiloxane, and hexamethyl cyclotetrasiloxane; tetra- and penta-methylcyclotetrasiloxanes; tetra-, penta-, hexa- and hepta-methylcyclopentasiloxanes; tetra-, penta- and hexamethyl-cyclohexasiloxanes, tetraethyl cyclotetrasiloxanes, and tetraphenyl cyclotetrasiloxanes. Preferred are 1,3,5,7-tetramethylcyclotetrasiloxane, 1,3,5,7,9-pentamethylcyclopentasiloxane, and 1,3,5,7,9,11-hexamethylcyclohexasiloxane, or blends thereof.

Most preferably, the silicon compound comprises a plurality of methylhydrocyclosiloxanes. Specifically, in a majority of cases, what is used is indeed a mixture of a number of species wherein n can vary widely, and reference hereinafter to MHCS can refer to such a mixture.

Generally, commercial MHCS mixtures contain up to about 20% (in purer forms, as low as 2%) low molecular weight linear methylhydrosiloxanes, such as heptamethyltrisiloxane, octamethyltetrasiloxane, etc. One suitable commercial mixture is Huls M8830 MHCS, available from Huls America, formerly Petrarch, Bristol, Pa.

The tetrahedral siloxysilanes are represented by the general formula:

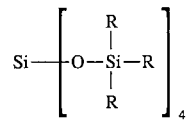

wherein R is as defined above, and is hydrogen on at least two silicon atoms in the molecule.

Examples include, e.g., tetrakisdimethylsiloxysilane, tetrakisdiphenylsiloxysilane, and tetrakisdiethylsiloxysilane. Tetrakisdimethylsiloxysilane is the best known and preferred species in this group.

Appropriate linear polysiloxanes include those having the general formula:

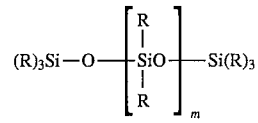

wherein R, which can be the same or different, is hydrogen, or a substituted or unsubstituted saturated alkyl radical, or a substituted or unsubstituted phenyl radical, at least two R's are hydrogen, and m is an integer from about 0 to 1000.

Suitable such linear polysiloxanes include the linear, short chain ≡SiH terminated polysiloxanes having the general formula:

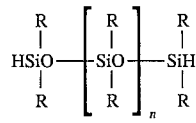

wherein n is 0 to 1000 and R is alkyl or aryl, preferably methyl or phenyl, as disclosed in LEIBFRIED '134 and LEIBFRIED '809.

These linear, short chain ≡SiH terminated polysiloxanes impart flexibility to the cured compositions, and can be used to produce elastomers. As examples of such polysiloxanes, disiloxanes, trisiloxanes, and other short siloxane oligomers, such as hexamethyltrisiloxane, are useful to lower viscosity, particularly for transfer molding operations where low viscosity is most desirable.

Yet additional suitable linear polysiloxanes are the linear poly(organohydrosiloxanes), having the general formula:

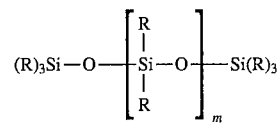

wherein R is a substituted or unsubstituted saturated alkyl radical or a substituted or unsubstituted phenyl radical, and 1%, or about 1%, to 50%, or about 50%, or more preferably 5%, or about 5%, to 50%, or about 50%, of the R's are hydrogen, and m is an integer from 5, or about 5, to 1000, or about 1000, or 3, or about 3, to 100, or about 100, and preferably 5, or about 5, to 100, or about 100, and the maximum value of m is most preferably about 60.

Exemplary linear poly(organohydrosiloxanes) include:
trimethylsiloxy-terminated methylhydropolysiloxane,
trimethylsiloxy-terminated dimethylsiloxanemethylhydrosiloxane copolymer,
dimethylsiloxy-terminated dimethylsiloxanemethylhydrosiloxane copolymer,
dimethylsiloxy-terminated polydimethylsiloxane,
trimethylsiloxy-terminated methyloctylsiloxanemethylhydro-siloxane copolymer,
dimethylsiloxy-terminated phenylmethylsiloxanemethylhydro-siloxane copolymer,
trimethylsiloxy-terminated methylcyanopropyl-siloxane-methylhydrosiloxane copolymer,
trimethylsiloxy-terminated 3,3,3-trifluoropropylmethylsiloxane methylhydrosiloxane copolymer,
trimethylsiloxy-terminated 3-aminopropylmethyl siloxane-methylhydrosiloxane copolymer,
trimethylsiloxy-terminated 2-phenylethylmethyl siloxane-methylhydrosiloxane copolymer, and
trimethylsiloxy-terminated 2-( 4-methylphenyl)-ethylmethyl-siloxane-methylhydrosiloxane copolymer.

Poly(organohydrosiloxanes) which may be used include those as disclosed in COWAN.

The compounds comprising at least one epoxy functionality (these compounds are also referred to herein as epoxy-functional compounds) include those compounds, e.g., monomers, and resins, having at least one epoxy functional group, and those polymers having epoxy functionality, which will undergo ring opening polymerization through such functional group and functionality; two or more such epoxy-functional compounds may be used in conjunction. Among the epoxy resins which are suitable epoxy-functional compounds are those as disclosed in ZAHIR, U.S. Pat. No. 4,954,580, which patent is incorporated herein in its entirety, by reference thereto.

Among the eligible epoxy-functional compounds are epoxyoctene, butadiene monoxide, 3,4-epoxycyclohexylmethyl- 3,4-epoxy-cyclohexanecarboxylate (available as CY 179 from Ciba Geigy Corporation, Hawthorne, N.Y.), bis(3, 4-epoxycyclohexyl)adipate (available as ERL 4299 from Union Carbide Chemicals and Plastics Company, Inc., Danbury, Conn.), and 2-(3,4-epoxycyclohexyl-5,5-spiro-3,4-epoxy)cyclohexane-metadioxane (available as ERL 4234, also from Union Carbide Chemicals and Plastics Company, Inc.).

Additional suitable epoxy-functional compounds are the following:
epoxy novolac resins, such as glycidyl ethers of phenol-formaldehyde copolymers, preferably in the molecular weight range of about 600–1000 (one such having an average molecular weight of about 680, and being available as DEN 431, from Dow Plastics, The Dow Chemical Company, Midland, Mich.), and such as phenol-dicyclopentadiene copolymers, and glycidyl ethers of cresol-formaldehyde copolymers;
polyglycol epoxy resins, such as glycidyl ethers of polyalkyloxides;
cycloaliphatic epoxides, such as vinyl cyclohexene monoxide (VCHO, and available from Union Carbide Chemicals and Plastics Company, Inc.), vinyl cyclohexene dioxide (available as ERL 4206, also from Union Carbide Chemicals and Plastics Company, Inc.), limonene oxide (available from Aldrich, Milwaukee, Wis.), limonene dioxide, vinyl norbornene monoxide, allylglycidylether, allylglycidylether acrylate, glycidyl acrylate, dicyclopentadiene monoxide, and dicyclopentadiene dioxide;
glycidyl substituted amines, such as tetraglycidyl methylene dianiline, tetraglycidyl diaminobenzene, N,N,N',N'-tetraglycidyl-4,4'-methylenebisbenzeneamine, and triglycidyl isocyanurate;
glycidyl ether of bisphenol A (this glycidyl ether having the formula:

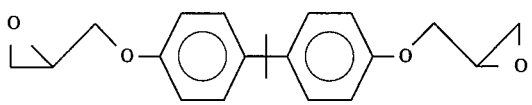

and being available as DER 332, also from Dow Plastics, The Dow Chemical Company), tetrabromobisphenol A, and bisphenol F;
glycidyl ethers of phenol-DCPD copolymers (one such having the formula:

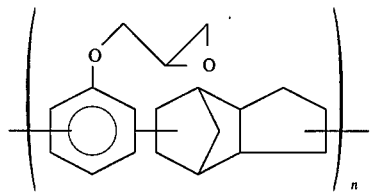

with an average molecular weight of about 620, and being available as Tactix 556, also from Dow Plastics, The Dow Chemical Company);
the DER-500 series epoxy resins, from Dow Plastics, The Dow Chemical Company, which are solid brominated bis-phenol A-based epoxy resins;
the DER-600 series epoxy resins, from Dow Plastics, The Dow Chemical Company, which are solid bis-phenol A-based epoxy resins, having an average repeat unit n greater than 1;
DEN-431, from Dow Plastics, The Dow Chemical Company, which is a low viscosity epoxy novolac resin; and
glycidyl ethers of epichlorohydrin-bisphenol A copolymers.

Epoxy-functional compounds suitable for the invention may further have—in addition to ring opening polymerizable epoxy functional group or functionality, as previously discussed—at least one hydrosilation reactive carbon-carbon double bond. The epoxy-functional compounds which are additionally vinyl- and allylic-functional are included in this category, and certain of the cycloaliphatic epoxides discussed above—i.e., vinyl cyclohexene monoxide, limonene oxide, limonene dioxide, vinyl norbornene monoxide, allylglycidylether, allylglycidylether acrylate, glycidyl acrylate, dicyclopentadiene monoxide—are particular examples.

Yet additional epoxy-functional compounds of the invention are the silicon-containing epoxy-functional compounds—i.e., the hydrosilation reaction products, of epoxy-functional compounds having at least one hydrosilation reactive carbon-carbon double bond, as discussed above, with silicon compounds having at least one hydrosilation reactive $\equiv$SiH group. These silicon-containing epoxy-functional compounds include those wherein the silicon compounds have been fully epoxy-substituted—i.e., with each $\equiv$SiH group having been thusly reacted with such epoxy-functional compound—as well as those wherein the silicon compounds have been only partially epoxy-substituted—i.e., having at least one $\equiv$SiH group unreacted with such epoxy-functional compound.

Appropriate epoxy-functional compounds, for preparing these silicon-containing epoxy-functional compounds, include those epoxy-functional compounds having at least one hydrosilation reactive carbon-carbon double bond, as discussed herein. Suitable silicon compounds include cyclic polysiloxanes, tetrahedral siloxysilanes, and linear polysiloxanes, including those as discussed herein.

hydrosiloxane copolymer being available as PS123.5, from Huls American Inc., Piscataway, N.J.), and the fully epoxycyclohexyl substituted hydrosilation product of vinylcyclohexene monoxide and linear phenylmethylmethylhydrosiloxane, having the formula:

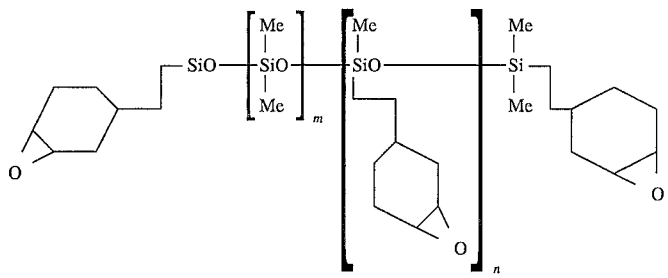

Included among these yet additional epoxy-functional compounds are the silicon-containing epoxy-functional compounds, e.g., monomers and oligomers, as disclosed in CRIVELLO et al., "The Synthesis, Characterization, and Photoinitiated Cationic Polymerization of Silicon-Containing Epoxy Resins", *Journal of Polymer Science: Part A: Polymer Chemistry*, vol. 28, pages 479–503 (1990), this article being incorporated herein in its entirety, by reference thereto. Additionally included are the epoxysiloxanes, as identified in ZAHIR.

Particularly preferred are the cyclohexene oxide terminated and glycidyl terminated siloxanes, and the cyclohexene oxide fully and partially substituted, and glycidyl fully and partially substituted, linear and cyclic hydrosiloxanes. Specific examples, of suitable silicon-containing epoxy-functional compounds, are 1,3-bis(3,4-epoxycyclohexylethyl) tetramethyldisiloxane (BTMDS), and 1,3,5,7-tetramethyl-tetrakis (3,4-epoxycyclohexylethyl)cyclotetrasiloxane ($D^{VCHO}_4$), having the formula:

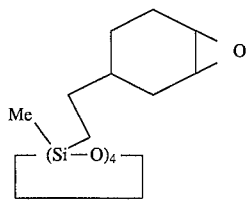

as well as the fully epoxycyclohexyl substituted hydrosilation product of vinylcyclohexene monoxide and linear dimethylmethylhydrosiloxane copolymer, having the formula:

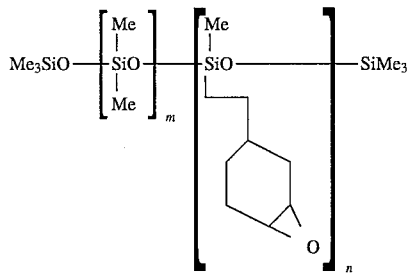

with a molecular weight of about 3200–4800, m being about 20–40, and n being about 6–11 (the linear dimethylmethylwith a molecular weight of about 1800–2500, m being about 2–7, and n being about 6–11 (the linear phenylmethylmethylhydrosiloxane copolymer being available as PS129.5, also from Huls American Inc.); these latter two hydrosilation products are also referred to herein as PS123.5-VHCO and PS129.5-VHCO, respectively. Suitable procedures, for preparing the silicon containing epoxy-functional compounds, include those as disclosed in the CRIVELLO et al. article cited immediately above, as well as in CRIVELLO et al., "Regioselective Ring-Opening Polymerizations and Hydrosilations Catalyzed by Transition Metals", *Macromol. Chem., Macromol-Symp.*, 54/55, pages 189–198 (1992), and in CRIVELLO et al., "Regioselective Rhodium-Containing Catalysts for Ring-Opening Polymerizations and Hydrosilations", *Journal of Polymer Science: Part A: Polymer Chemistry*, Vol. 30, pages 1–11 (1992); these latter two articles are incorporated herein in their entireties, by reference thereto.

The curing agents of the invention are those which facilitate the curing of the epoxy-functional compounds of the invention, and, particularly, facilitate the ring opening polymerization of such epoxy compounds; in a particularly preferred embodiment, such curing agents include those compounds which polymerize with the epoxy-functional compound or compounds, in the ring opening polymerization thereof.

Two or more such curing agents may be used in combination. Suitable curing agents include those as disclosed in ZAHIR.

Among the eligible curing agents are the anhydrides, particularly the polycarboxylic anhydrides, such as nadic anhydride (NA), methylnadic anhydride (MNA—available from Aldrich), phthalic anhydride, tetrahydrophthalic anhydride, hexahydrophthalic anhydride (HHPA—available from Anhydrides and Chemicals Inc., Newark, N.J.), methyltetrahydrophthalic anhydride (MTHPA—available from Anhydrides and Chemicals Inc.), methylhexahydrophthalic anhydride (MHHPA—available from Anhydrides and Chemicals Inc.), endomethylenetetrahydrophthalic anhydride, hexachloroendomethylenetetrahydrophthalic anhydride (Chlorentic Anhydride—available from Velsicol Chemical Corporation, Rosemont, Ill.), trimellitic anhydride, pyromellitic dianhydride, maleic anhydride (MA—available from Aldrich), succinic anhydride (SA), nonenylsuccinic anhydride, dodecenylsuccinic anhydride (DDSA— available from Anhydrides and Chemicals Inc.), polysebacic polyanhydride, and polyazelaic polyanhydride.

Further suitable curing agents are the amines, including aromatic and aliphatic amines, e.g., the aliphatic, cycloaliphatic, aromatic and heterocyclic polyamines. Particular suitable examples are 1,4-cyclohexane-bis(methylamine), 1,3-bis(3-aminopropyl)tetramethyldisiloxane, hexamethylenediamine, triethylenetetraamine, N-aminoethyl piperazine (AEP-available from Aldrich), 1,3-diaminobenzene, 1,4-diaminobenzene, 4,4'-diaminodiphenylmethane, and the polyaminosulfones, such as 4,4'-diaminodiphenyl sulfone (4,4'-DDS—available from Ciba Geigy Corporation), 4-aminophenyl sulfone, and 3-aminophenyl sulfone.

Also eligible are the polyols, such as ethylene glycol (EG—available from Aldrich), poly(propylene glycol), and poly(vinyl alcohol); and the phenol-formaldehyde resins, such as the phenol-formaldehyde resin having an average molecular weight of about 550–650, the p-t-butylphenol-formaldehyde resin having an average molecular weight of about 600–700, and the p-n-octylphenol-formaldehyde resin, having an average molecular weight of about 1200–1400, these being available as HRJ 2210, HRJ-2255, and SP-1068, respectively, from Schenectady Chemicals, Inc., Schenectady, N.Y.). Further as to phenol-formaldehyde resins, a combination of CTU guanamine, and phenol-formaldehyde resin having a molecular weight of 398, commercially available as CG-125, from Ajinomoto USA Inc., Teaneck, N.J., is also suitable.

Yet other resins containing phenolic groups can be used, such as resorcinol based resins, and resins formed by cationic polymerization, such as DCPD-phenol copolymers. Still additional suitable resins are melamine-formaldehyde resins, and urea-formaldehyde resins.

Different commercially available compositions may be used as curing agents in the present invention. One such composition is AH-154, a dicyandiamide type formulation, available from Ajinomoto USA Inc. Others which are suitable include Ancamide 400, which is a mixture of polyamide, diethyltriamine, and triethylenetetraamine, Ancamide 506, which is a mixture of amidoamine, imidazoline, and tetraethylenepentaamine, and Ancamide 1284, which is a mixture of 4,4'-methylenedianiline and 1,3-benzenediamine; these formulations are available from Pacific Anchor Chemical, Performance Chemical Division, Air Products and Chemicals, Inc., Allentown, Pa.

Still additional suitable curing agents include 3,9-bis(3-aminopropyl-2,4,8,10-tetroxaspiro[5.5]undecane, which is commercially available as ATU, from Ajinomoto USA Inc., as well as aliphatic dihydrazide, which is commercially available as Ajicure UDH, also from Ajinomoto USA Inc., and mercapto-terminated polysulfide, which is commercially available as LP 540, from Morton International, Inc., Chicago, Ill.

Where curing agent is used, one or more curing accelerators, or catalytic curing agents, may also be present. Suitable curing accelerators include those as disclosed ZAHIR.

Among the eligible curing accelerators are complexes of amines, particularly dimethylaniline, and also particularly tertiary amines, such as monoethylamine, trimethylamine and octyldimethylamine, with boron trifluoride or boron trichloride; one suitable example is a complex of dimethylaniline and boron trifluoride ($BF_3$.DMA), also available from Aldrich. Also suitable are tertiary amines, such as 1,1'-methylenebis (3-methylpiperidine) (MBMP—available from Aldrich), dimethylbenzylamine (DMBA), tris(dimethylaminomethyl) phenol (TDMAMP—available from Aldrich), hexamethylenetetramine and 1,6-bis-(dimethylamino)hexane; urea derivatives, such as N-4-chlorophenyl-N',N'-dimethylurea (monuron), N-3-chloro-4-methylphenyl-N',N'-dimethylurea (chlortoluron), N-(2-hydroxyphenyl) -N',-N'-dimethylurea and N-(2-hydroxy-4-nitrophenyl) -N',-N'dimethylurea, and Amicure UR2T, a substituted urea formulation, available from Pacific Anchor Chemical; and substituted and unsubstituted imidazoles, such as imidazole, benzimidazole, 1-methylimidazole, 3-methylimidazole, 1,2-dimethylimidazole (1,2-DMI-available from Aldrich), 2-ethyl- 4-methylimidazole, (2,4-EMI—available from Aldrich), 1-vinylimidazole (1-VI, available from Aldrich), 2-vinylimidazole, 2-phenylimidazole, 2-phenyl-4-methylimidazole, 1-(2,6-dichlorobenzoyl)-2-phenylimidazole, and 1-(2,4,6-trimethylbenzoyl)-2-phenylimidazole. Where prepolymers are employed—as in the fourth embodiment, discussed herein organic—phosphines may be employed as curing accelerators; triphenyl phosphine is a suitable example.

Hydrosilation catalyst can be included, with curable blends of the invention, for effecting the cure thereof, and thereby obtaining the final, cured product. For instance, this catalyst facilitates the hydrosilation reaction, where there are $\equiv$SiH groups and carbon-carbon double bonds available therefor, and conditions are otherwise suitable for supporting hydrosilation.

Further, where ring opening polymerization, through the epoxy functionality, operates as a curing mechanism, the hydrosilation catalyst, and available $\equiv$SiH groups—if sufficient of both are present for this purpose—act in concert to catalyze such curing of the epoxy, in the manner as set forth in CRIVELLO et al., "Regioselective Ring-Opening Polymerizations and Hydrosilations Catalyzed by Transition Metals", *Macromol. Chem., Macromol-Symp.*, 54/55, pages 189–198 (1992), and in CRIVELLO et al., "Novel Platinum-Containing Initiators for Ring-Opening Polymerizations", *Journal of Polymer Science: Part A: Polymer Chemistry*, Vol. 29, pages 1853–1863 (1991), as well as CRIVELLO et al., "Novel Platinum Initiators for Ring-Opening Polymerizations", *Polymer Preprints*, Vol. 32, pp.338–339 (1991). The latter two of these publications are incorporated herein in their entireties, by reference thereto; further, the ring opening polymerization can be effected in accordance with the teachings of these publications.

The hydrosilation catalyst, where employed, is preferably provided in an amount of about 5–60 ppm, based on the total weight of the curable blend. Where, as indicated, sufficient of both $\equiv$SiH groups and hydrosilation catalyst are present for catalyzing ring opening polymerization, then—if there is likewise enough epoxy functionality for the polymerization to occur—such polymerization will take place, even in the absence of curing agent; in this regard, it is noted that the presence of such curing agent—and optionally, in addition, curing accelerator—is still within the scope of the invention, even if there are also sufficient of the $\equiv$SiH groups and hydrosilation catalyst present, as indicated, catalyze the ring opening polymerization.

The hydrosilation catalysts include metal salts and complexes of Group VIII elements. The preferred hydrosilation catalysts contain platinum (e.g., $PtCl_2$, dibenzonitrile platinum dichloride, platinum on carbon, dichloro(1,2-cyclooctadiene)platinum (II) [(COD)$PtCl_2$], available from Strem Chemicals, Inc., Newburyport, Mass., etc.).

One such platinum catalyst which is suitable, in terms of both reactivity and cost, is chloroplatinic acid ($H_2PtCl_6.6H_2O$); also appropriate are the platinum complex of divinyltetramethyldi-siloxane, available as PC075 from Huls America, and the platinum-containing catalysts PC072 (a platinum divinyl complex) and PC085, also available from Huls America. One preferred catalyst is a complex of chloroplatinic acid and dicyclopentadiene, as disclosed, for instance, in LEIBFRIED '779, and in BARD et al. '360. A second preferred catalyst is the indicated (COD)PtCl$_2$.

Also suitable, as hydrosilation catalysts for curable blends of the invention, are those as disclosed in CRIVELLO et al., "Novel Platinum-Containing Initiators for Ring-Opening Polymerizations", *Journal of Polymer Science: Part A: Polymer Chemistry,* Vol. 29, pages 1853–1863 (1991).

Blends of the invention are preferably curable. Such curable blends can be prepared by any suitable means, such as conventional mixing of the requisite components.

As a general matter, the curing itself is preferably effected thermally. As one suitable method, the curable blend is degassed under vacuum, with heating then being conducted in an inert atmosphere, e.g., under nitrogen. Consistent with the foregoing discussion, among the reactions which can occur, during curing of the curable blend, are hydrosilation, and epoxy ring opening polymerization.

In a first embodiment, the curable blend comprises hydrosilation catalyst and the reactants, i.e., including the polyene, silicon compound, and epoxy-functional compound, as well as any additional components which may be used, such as the indicated curing agent; where curing agent is present, curing accelerator can likewise be included. These reactants are suitably blended, then subjected to a suitable curing procedure, until the cured product is achieved.

In this first embodiment, at least one of the polyene, and the silicon compound, has more than two hydrosilation reactive sites. The curing procedure is conducted so as to effect hydrosilation of such polyene and silicon compound, and thereby provide their crosslinking, and also to effect hydrosilation of the epoxy-functional compound and silicon compound, where the former likewise has at least one hydrosilation reactive carbon-carbon double bond; yet further, curing is conducted so as to effect ring opening polymerization of the epoxy functionality.

In a second embodiment, the curable blend includes, besides the hydrosilation catalyst, the silicon compound, epoxy-functional compound which is further provided with at least one hydrosilation reactive carbon-carbon double bond, curing agent, and, optionally, curing accelerator. In this instance, the blend includes little, or, more preferably, none, of the polyene.

As a variation on the immediately foregoing blend of the second embodiment, the epoxy-functional compound and silicon compound are reacted in a separate, initial step, in the presence of the indicated hydrosilation catalyst. This is a hydrosilation reaction, between the hydrosilation reactive $\equiv$SiH groups of the silicon compound, and the hydrosilation reactive carbon-carbon double bonds of the epoxy-functional compound.

Such hydrosilation can be effected by mixing the indicated silicon and epoxy-functional compounds, in the correct relative ratios, and a suitable amount of hydrosilation catalyst—preferably, about 5 to 5,000 ppm thereof. This mixture is brought to a temperature at which hydrosilation is initiated, and proper temperature conditions are thereafter maintained, to drive the hydrosilation reaction to at least substantial completion.

The result of this initial step is an epoxy-substituted silicon compound—i.e., a silicon-containing epoxy-functional compound, as previously discussed. The curable blend then subjected to the curing procedure includes this epoxy-substituted silicon compound, as well as curing agent, and, optionally, curing accelerator.

Whether or not the indicated separate, initial step is employed in this second embodiment, the amount, of the epoxy-functional compound, is preferably sufficient so that the hydrosilation reactive carbon-carbon double bonds effect complete hydrosilation, or at least substantially complete hydrosilation, of the silicon compound hydrosilation reactive $\equiv$SiH groups. Further as a matter of preference, the epoxy-functional compound is monoolefinic—i.e., supplying one such hydrosilation reactive carbon-carbon double bond.

In the instance of the epoxy-functional compound being thusly monoolefinic, the ratio of hydrosilation reactive carbon-carbon double bonds contributed by such epoxy-functional compound, to hydrosilation reactive $\equiv$SiH groups, is preferably 1:1, or approximately 1:1. Accordingly, where the separate, initial step is employed, the product resulting therefrom will be a fully, or at least substantially fully, epoxy-substituted silicon compound, or silicon-containing epoxy-functional compound.

The previously discussed silicon-containing epoxy-functional compounds disclosed in CRIVELLO et al., "The Synthesis, Characterization, and Photoinitiated Cationic Polymerization of Silicon-Containing Epoxy Resins", Journal of Polymer Science: Part A: Polymer Chemistry, Vol. 28, pages 479–503 (1990), and the epoxysiloxanes, as identified in ZAHIR, are suitable such fully epoxy-substituted silicon compounds. Further, these compounds may be prepared in accordance with the procedures disclosed in CRIVELLO et al. and ZAHIR.

Where the indicated separate, initial step is employed, the curing is effected so as to provide ring opening polymerization of the epoxy functionality. In the absence of this initial step, the curing is also effected so that, in addition to such ring opening polymerization, hydrosilation of the silicon compound, and the epoxy-functional compound, likewise results.

In yet a third embodiment, an epoxy-substituted silicon compound is also prepared as an initial step, which can be effected as set forth above. Here, however, the amount, of the carbon-carbon double bond containing epoxy-functional compound, is sufficient only for partial hydrosilation of the silicon compound; what results from this initial step is accordingly a partially epoxy-substituted silicon compound.

Correspondingly, polyene is included in the curable blend for this embodiment. Preferably, the amount of such polyene is sufficient so as to provide complete—or at least substantially complete—hydrosilation of the hydrosilation-reactive $\equiv$SiH groups remaining unreacted, in the indicated partially epoxy-substituted silicon compound.

As with the previously discussed second embodiment, the epoxy-functional compound is preferably monoolefinic—i.e., as indicated, supplying one such hydrosilation reactive double bond. In such instance, the relative amounts of silicon compound, and the carbon-carbon double bond containing epoxy-functional compound, are such so as to provide an excess—specifically, anywhere from a slight to a great excess—of hydrosilation-reactive $\equiv$SiH groups, relative to the hydrosilation-reactive carbon-carbon double bonds of the epoxy-functional compound.

More specifically, where the epoxy-functional compound is thusly monoolefinic, the ratio of (i) hydrosilation reactive $\equiv$SiH groups in the silicon compound, to (ii) hydrosilation reactive carbon-carbon double bonds, in the epoxy-functional compound, is greater than 1:1. Correspondingly, the amount of polyene is such so as to provide sufficient hydrosilation reactive carbon-carbon double bonds to raise the ratio at least to 1:1, or approximately 1:1; in other words, the ratio of hydrosilation reactive ≡SiH groups contributed by the original silicon compound—i.e., in preparing the partially epoxy substituted silicon compound—to the sum of hydrosilation reactive carbon-carbon double bonds contributed by the original epoxy-functional compound, and the polyene, will be 1:1, or approximately 1:1.

For this third embodiment, then, the amounts of polyene and of epoxy-functional compound are accordingly inversely proportional—"amount", in this context, pertaining to hydrosilation-reactive carbon-carbon double bonds supplied by such polyene and epoxy-functional compound. Specifically, where a relatively large amount of epoxy-functional compound is employed for preparing the partially epoxy-substituted silicon compound, then the amount of polyene in the blend is correspondingly less.

Further, at least one of the polyene, and the silicon compound employed in preparing the partially epoxy-substituted silicon compound, has more than two hydrosilation reactive sites, so as to provide crosslinking from the hydrosilation. Curing can be conducted according to the procedure which is suitable for effecting hydrosilation in the second embodiment.

The epoxy-functional compound can be employed, in such an amount, so as to provide sufficient epoxy functionality for supporting ring opening polymerization—preferably, sufficient to make ring opening polymerization the predominant cure mechanism. Here, curing agent, and optionally, curing accelerator, can be likewise be employed.

If, in this curable blend, there are a sufficiency of hydrosilation catalyst, and hydrosilation reactive SiH groups, to catalyze polymerization of the epoxy functionality, then the presence of such curing agent and curing accelerator is not mandatory for this purpose. However, even in such instance, curing agent, and, optionally, curing accelerator, can be included.

Further in this variation of the third embodiment, in addition to providing the indicated hydrosilation, curing is effected so as to provide ring opening polymerization of the epoxy functionality. Accordingly, here the silicon compound, employed in preparing the partially epoxy-substituted silicon compound, has more than two hydrosilation reactive sites, so that such polymerization provides crosslinking.

In a fourth embodiment, the curable blend comprises prepolymer—preferably, crosslinkable prepolymer, and more preferably, crosslinkable organosilicon prepolymer—and epoxy-functional compound; in a particularly preferred embodiment, the polyene and silicon compound are provided to such curable blend in the form of the indicated crosslinkable organosilicon prepolymer, which has been prepared by hydrosilation, from reactants comprising such polyene and silicon compound. This curable blend, including the hydrosilation catalyst, and such prepolymer, as well as epoxy-functional compound, and any additional components—such as, but not limited to, the curing agent and curing accelerator, as previously discussed, as well as additional polyene and silicon compound—is likewise subjected to the curing procedure.

The same hydrosilation catalysts previously discussed are likewise appropriate for use in preparation of the prepolymer. For those of such catalysts which are platinum catalysts, catalyst concentrations of about 0.0005 to about 0.05% by weight of platinum, based on the weight of monomers, are preferred.

With regard to this fourth embodiment, if the prepolymer of the curable blend contains a sufficient amount, of the hydrosilation catalyst used in its preparation, to effect curing of such blend, then the cured composition of the invention can be obtained without requiring further addition of hydrosilation catalyst. Alternatively, if necessary, the curable blend can be provided with additional hydrosilation catalyst.

The crosslinkable organosilicon prepolymers suitable for the invention include those prepolymers as disclosed in LEIBFRIED '779, LEIBFRIED '731, LEIBFRIED '134, BARD et al. '360, and COWAN. The crosslinkable prepolymers suitable fort he invention also include those prepolymers as disclosed in BARD et al. '303, U.S. Pat. No. 5,068,303, BURNIER '048, U.S. Pat. No. 5,025,048, BURNIER '735, U.S. Pat. No. 5,118,735, and in U.S. applications Ser. No. 593,161, now U.S. Pat. No. 5,242,979, filed Oct. 5, 1990, Ser. No. 593,168, now abandoned, filed Oct. 5, 1990, Ser. No. 685,360, filed Apr. 15, 1991, now U.S. Pat. No. 5,171,817, and Ser. No. 764,746, filed Sep. 24, 1991, now U.S. Pat. No. 5,196,498; these patents and applications are incorporated herein in their entireties, by reference thereto.

Preferred crosslinkable organosilicon prepolymers are those comprising:
(a) at least one polyene having at least two hydrosilation reactive carbon-carbon double bonds; and
(b) at least one silicon compound, having at least two hydrosilation reactive ≡SiH groups, and comprising at least one member selected from the group consisting of cyclic polysiloxanes, tetrahedral siloxysilanes, and linear polysiloxanes;

wherein at least one of the at least one polyene and the at least one silicon compound has more than two hydrosilation reactive sites. Most preferably, the at least one silicon compound has three or more hydrosilation reactive ≡SiH groups.

Suitable polyenes and silicon compounds, for such prepolymers, include those as discussed herein.

Where the crosslinkable prepolymers, of the invention, are the indicated crosslinkable organosilicon prepolymers i.e., comprising at least one polyene, and one or more one cyclic polysiloxanes, and/or tetrahedral siloxysilanes, and/or linear polysiloxanes, as discussed at length above—the ratio of total hydrosilation reactive carbon-carbon double bonds, contributed thereto by the at least one polyene, to hydrosilation reactive ≡SiH groups, contributed thereto by the at least one silicon compound, is preferably in the range of 0.1:1, or about 0.1:1, to 1.5:1, or about 1.5:1; more preferably, this ratio is in the range of 0.5:1, or about 0.5:1, to 1.2:1, or about 1.2:1; still more preferably, this ratio is in the range of 0.8:1, or about 0.8:1, to 1.2:1, or about 1.2:1. Most preferably, this ratio is 1:1, or about 1:1.

Further as to crosslinkable organosilicon prepolymers of the invention, included among such prepolymers are the crosslinkable linear poly(organohydrosiloxane) prepolymers, comprising linear poly (organohydrosiloxane) with hydrosilation reactive ≡SiH groups having been reacted with polyene—preferably, polycyclic polyene. Suitable polyenes, such as polycyclic polyenes, include those as discussed herein.

In these crosslinkable linear poly (organohydrosiloxane) prepolymers, preferably, 5% to 90%—more preferably, at least 30%, and, most preferably, 30% to 60%—of such hydrosilation reactive ≡SiH groups have been thusly reacted with polyene. Appropriate linear poly (organohydrosiloxanes) for these prepolymers, are those as discussed herein, with both the general formula, and the exemplary linear poly(organohydrosiloxanes), being applicable.

The crosslinkable prepolymers of the invention can be prepared utilizing the procedures and components, including, but not limited to, process steps and catalysts, as set forth in LEIBFRIED '779, LEIBFRIED '731, LEIBFRIED '134, BARD et al. '360, BARD et al. '303, BURNIER '048, BURNIER '735, and COWAN, and in U.S. applications Ser. No. 593,161, now U.S. Pat. No. 5,242,979, Ser. No. 593, 168, now abandoned, and 685,360, now U.S. Pat. No. 5,171,817. The reactions for forming the prepolymer, can be promoted thermally, or by the addition of a hydrosilation catalyst or radical generators such as peroxides and azo compounds.

One approach for preparing, as the crosslinkable prepolymer of the invention, a crosslinkable organosilicon prepolymer as previously discussed, is simply to mix the correct relative ratios of components—i.e., including the polyene, silicon compound, and hydrosilation catalyst—and bring the mixture to a temperature at which the reaction is initiated. Proper temperature conditions are thereafter maintained, to drive the reaction to the degree of completion requisite for obtaining the desired prepolymer.

In this regard, reaction conditions utilized are those which are requisite for obtaining a prepolymer, within the meaning of the term as defined herein—i.e., such polymer being partially cured, but not cured up to or beyond its gel point; for instance, the mixture of the components is maintained at about 30° to 80° C., for several hours, then interrupted at the point where the requisite proportion of available hydrosilation reactive ≡SiH groups have been reacted—preferably, 5% to 80% thereof. More preferably, this polymerization is effected so that, 30% to 65%, and most preferably, 30% to 50%, of available hydrosilation reactive ≡SiH groups have been reacted.

The indicated preparation of prepolymer can be conducted as a two stage procedure; in such instance, the polyene used, in ultimate preparation of the prepolymer, is itself first prepared in the same manner as the prepolymer. In this regard, such polyene is obtained by heating a mixture of hydrosilation catalyst, silicon compound, and initial polyene—those polyenes discussed herein being suitable as such initial polyene—to effect the hydrosilation reaction; more specifically, the polyene can be prepared in the manner as set forth in LEIBFRIED '134 and LEIBFRIED '809.

For this preparation of the polyene, the relative proportions of initial polyene and silicon compound employed are such that there is a large excess of hydrosilation reactive carbon-carbon double bonds available for reaction with the hydrosilation reactive ≡SiH groups; that is, the ratio of hydrosilation reactive carbon-carbon double bonds of initial polyene, to hydrosilation reactive ≡SiH groups of silicon compound, is between about 2:1 and about 10:1. Excess initial polyene which remains after this reaction is removed by any suitable method, such as conventional stripping—e.g., by distillation under vacuum.

In the resulting polyene, the ratio of total hydrosilation reactive carbon-carbon double bonds, contributed thereto by the initial polyene, to hydrosilation reactive ≡SiH groups, contributed thereto by the silicon compound, is preferably at least 1.8:1, or at least about 1.8:1; more preferably, it is greater than 1.8:1, or greater than about 1.8:1. Still more preferably, this ratio is greater than 1.8:1, or about 1.8:1, and up to 2.2:1, or about 2.2:1; most preferably, it is greater than 1.8:1, or about 1.8:1, and up to 2.0:1, or about 2.0:1.

In the formation of this resulting polyene, the hydrosilation reactive ≡SiH groups, which have been contributed thereto by the silicon compound, are fully, or at least substantially fully, reacted with the hydrosilation-reactive carbon-carbon double bonds which have likewise been contributed by the initial polyene. In this context, "at least substantially fully" means approximately 90%, or more, of the ≡SiH groups have been reacted.

As to such hydrosilation-reactive carbon-carbon double bonds contributed by the initial polyene, those which have not been thusly reacted, with the indicated ≡SiH groups, are available for further hydrosilation. The resulting polyene is accordingly provided with at least two hydrosilation-reactive carbon-carbon double bonds.

This resulting polyene can accordingly be used in preparation of the prepolymer, for such curable blends oft he invention which incorporate prepolymer—i.e., in the fourth embodiment, as previously discussed. Additionally, the resulting polyene is likewise suitable as the polyene, for curable blends of the invention where the prepolymer is not employed—i.e., for the first second, and third embodiments, likewise as previously discussed.

Of those hydrosilation reactive carbon-carbon double bonds thusly contributed, but not reacted with the ≡SiH groups, such hydrosilation reactive carbon-carbon double bonds which are part of the thusly reacted initial polyene—which, in turn, is now part of the resulting polyene—will accordingly be available for reaction with hydrosilation reactive ≡SiH groups of further silicon compound, in the second stage of the indicated two stage procedure. This second stage is preparation of the crosslinkable prepolymer, and can be conducted—with such resulting polyene, and such further silicon compound—in the manner for preparing crosslinkable organosilicon prepolymer, as previously discussed.

As to such two stage prepolymer, the ratio of total hydrosilation reactive carbon-carbon double bonds, contributed thereto by such resulting polyene, to hydrosilation reactive ≡SiH groups, contributed thereto by such further silicon compound, will preferably also be the same as previously discussed, with respect to preparation of crosslinkable organosilicon prepolymer—i.e., preferably in the range of 0.1:1, or about 0.1:1, to 1.5:1, or about 1.5:1; more preferably, in the range of 0.5:1, or about 0.5:1, to 1.2:1, or about 1.2:1; still more preferably, in the range of 0.8:1, or about 0.8:1, to 1.2:1, or about 1.2:1; most preferably, 1:1, or about 1:1.

Particularly as to preparing the crosslinkable linear poly(organohydrosiloxane) prepolymer of the invention, as discussed herein, hydrosilation catalyst and polycyclic polyene are mixed and heated to form a complex. This complex and the poly(organohydrosiloxane) are thereafter combined, and, as with respect to the previously discussed organosilicon prepolymer, suitable reaction conditions are utilized to obtain the requisite prepolymer.

Particularly, the reaction mixture is heated to about 40° to 80° C.; as previously discussed with reference to preparation of the organosilicon crosslinkable prepolymer, the reaction temperature is thusly maintained for several hours, then interrupted at the point where the requisite proportion of available hydrosilation reactive ≡SiH groups have been reacted—preferably, for this poly(organohydro-siloxane) prepolymer, 5% to 90% thereof. More preferably, the polymerization is effected so that 30% to 60%, of such available hydrosilation reactive ≡SiH groups, have been reacted.

As to the immediately following discussion, concerning suitable polycyclic polyenes for obtaining the requisite poly(organohydrosiloxane) prepolymer, from the indicated lower temperature reaction, such discussion is provided according to the best understanding of this matter at the present. This discussion is not intended to limit the scope of the invention.

Specifically, so that the requisite poly(organohydrosiloxane) prepolymer, preferably being flowable and heat curable, can be obtained from such lower temperature reaction, even though the ratio of hydrosilation reactive carbon-carbon double bonds to hydrosilation reactive ≡SiH groups is otherwise suitable for obtaining the crosslinked polymer, it appears that an appropriate polycyclic polyene is required; suitable such polycyclic polyenes are those having chemically distinguishable hydrosilation reactive carbon-carbon double bonds, i.e., one such bond being more reactive during hydrosilation than the other. These polycyclic polyenes include, for example, cyclopentadiene oligomers such as dicyclopentadiene and cyclopentadiene trimer, and methyl dicyclopentadiene.

Curing, for the fourth embodiment, can be conducted according to the same conditions as utilized for the first embodiment.

Yet further components, other than those previously specified, may be included in the invention; such components may be provided to the curable blends of the invention, and/or, where a prepolymer is employed, in preparation of such prepolymer, depending upon the properties of the components and prepolymer. Further as to such additional components, it is understood that those particular additional components, which are specifically discussed, are not provided by way of limitation, and that yet others, not specifically described, may also be suitable.

For instance, what is identified, in U.S. application Ser. No. 764,746, now U.S. Pat. No. 5,196,498, as the at least one second silicon compound, is a suitable such additional component. This component is particularly noted as one which can be provided to curable blends of the invention as a starting material, and/or employed in preparation of prepolymer.

Other yet additional further components include reaction rate modifiers, as disclosed in U.S. applications Ser. No. 593,168, now abandoned, and Ser. No. 764,829, now U.S. Pat. No. 5,340,644.

Still additional further components include flame retardants, as disclosed in U.S. application Ser. No. 893,610, now abandoned, filed Feb. 21, 1992. This application is incorporated herein in its entirety, by reference thereto.

As yet further examples of additional components, carbon (graphite), quartz, aramid, and other polymeric fibers may be included in the curable blends of the invention; these materials are wetted very well by the liquid prepolymers of the invention, making them excellent matrix materials. Fiber can be in non-woven, unidirectional, woven, fabric, etc., form; suitable fibers and prepregs include those as discussed in BARD '360.

Additives such as fillers and pigments are also readily incorporated. Vermiculite, mica, wollastonite, calcium carbonate, sand, silica, fumed silica, fused silica, ceramic beads, hollow glass, glass spheres, glass beads, ground glass, waste glass and other mineral fillers are examples of fillers which can be incorporated. Fillers can serve either as reinforcement or as fillers and extenders to reduce the cost of the molded product; glass spheres, in particular, are useful for preparing low density composites. Fillers can also be used for other reasons, such as viscosity modification. Fillers can be present in amounts up to about 15% by weight of the curable blends of the invention, and in even higher amounts, i.e., up to about 95% by weight, when glass fibers are not used.

Stabilizers (anti-oxidants) are useful to maintain storage stability of the prepolymers, in curable blends of the invention, and thermal oxidative stability, of the finally cured products. Examples include bis(1,2,2,6,6-pentamethyl- 4-piperidinyl)-(3,5-di-tert-butyl-4-hydroxybenzyl)butylpropanedioate (available as Tinuvin™ 144 from Ciba-Geigy Corp., Hawthorne, N.Y.), or a combination of octadecyl 3,5-di-tert-butyl-4-hydroxyhydrocinnamate (also known as octadecyl 3-(3',5'-di-tert-butyl-4'-hydroxyphenyl) propionate) (available as Naugard™ 76 from Uniroyal Chemical Co., Middlebury, Conn.) and bis(1,2,2,6,6-pentamethyl-4-piperidinyl-sebacate) (available as Tinuvin™ 765 from Ciba-Geigy Corp.). Stabilizers are generally used in an amount of about 0.5% to about 3.0%, based on the weight of the prepolymer of the curable blend. Generally, the stabilizers can be employed as disclosed in BURNIER '048, and in BURNIER '735.

One or more elastomers can also be added to improve toughness. Preferred are hydrocarbon elastomers having a molecular weight of less than 100,000 and low molecular weight siloxane elastomers. Exemplary hydrocarbon elastomers are low molecular weight ethylene-propylene-diene terpolymers, low molecular weight butyl rubber, partially hydrogenated low molecular weight polyisoprene or natural rubber, and partially hydrogenated low molecular weight polybutadiene or styrene-butadiene copolymers. Exemplary siloxane rubbers include low molecular weight vinyl or SiH terminated polydimethyl/diphenyl siloxane copolymers. Preferred are low molecular weight ethylene-propylene-dicyclopentadiene and ethylene-propylene-ethylidenenorbornene polymers having a molecular weight of 5500 to 7000. Most preferred is Trilene 65 elastomer (available from Uniroyal Chemical Co.). The elastomer or elastomers are generally used in an amount of 0.5 to 20%, preferably 3 to 12%, and most preferably 5 to 10%, by weight of the total composition; higher levels may be useful in some applications. Generally, elastomers can be employed as disclosed in U.S. applications Ser. No. 593,161, U.S. Pat. No. 5,242,979, and Ser. No. 685,360, now U.S. Pat. No. 5,171,817.

Particularly with regard to the previously discussed second embodiment, of the curable blend of the invention, cyanate ester resins can be employed, as formulating ingredients.

For the previously discussed third embodiment, the epoxy functionality can provide improved adhesion to substrates, fibers, and fillers, such as those previously disclosed, which are present. Further, such epoxy functionality can improve compatibility with blend ingredients—both those which are non-reactive, such as thermoplastics and elastomers, and those which are reactive, such as different thermosetting resins, reactive oligomers, and functionalized elastomers which are included.

Where such different thermosetting resin is thusly included, both hydrosilation, and the cure mechanism of this resin, can occur during the curing process. Further, interaction or reaction, of the epoxy functionality, with this other thermosetting resin, can contribute to improvement in compatibility.

Generally as to the relative proportions and different types of components used in preparing the curable and cured compositions of the invention, these can be determined without undue experimentation, by those of ordinary skill in the art, according to a variety of factors. Such factors include, but are not limited to, the compatibility of such components, whether they will react with one another, and—where they will react with one another—the stoichiometry of the reactions which occur; still additional factors concern the properties desired in the curable blend and cured product.

In this regard, one set of proportions to consider is the ratio of total hydrosilation reactive carbon-carbon double bonds, to total hydrosilation reactive ≡SiH groups, ultimately contributed from all sources—e.g., polyene, silicon compound, and epoxy-functional compound—in preparing the compositions of the invention, whether contributed to preparation of the prepolymer, or to the final, cured product. This ratio is preferably in the range of 0.1:1, or about 0.1:1, to 1.5:1, or about 1.5:1; more preferably, this ratio is in the range of 0.5:1, or about 0.5:1, to 1.2:1, or about 1.2:1; still more preferably, this ratio is in the range of 0.8:1, or about 0.8:1, to 1.2:1, or about 1.2:1. Most preferably, this ratio is 1:1, or about 1:1.

In this regard, where curing agent is employed, the amounts thereof provided are those which are customary in the technology of the epoxy compounds with which they are used. Preferably, the amount of curing agent used is such as to provide about 0.7 to 1.5 equivalents, of curing agent functional groups, to one epoxide equivalent.

More particularly, for amine curing agent, the amount of amine employed is preferably such so as to provide 0.75 to 1.25 equivalents, of amine hydrogen, per epoxide equivalent. In the case of the polycarboxylic anhydrides, the preferred amount of curing agent is such so as to provide 0.4 to 1.1 equivalents, of anhydride groups, per epoxide equivalent.

Curing accelerator is employed to enhance the activity— especially, the curing activity—of the curing agent. As a particularly preferred function, curing accelerator is employed to enhance the participation of curing agent, in the ring opening polymerization of the epoxy-functional compound. The curing accelerators are generally used in proportions of 0.1%, or about 0.1%, to 6%, or about 6%, by weight of the total components in the blend; preferably, the accelerators are thusly employed in catalytic amounts.

Where prepolymer is employed, such prepolymer, and the epoxy-functional compound, may be used in any relative proportions which will allow the cured composition of the invention to be obtained. Preferably, such prepolymer and epoxy-functional compound are employed in any relative proportions in which they are miscible.

In this regard, similarity of chemical structure is a factor which affects the miscibility of multiple components; in this regard, the closer the chemical structure of such components, the less a factor immiscibility will be, in limiting the amount of epoxy-functional compound which can be used with the prepolymer. Accordingly, where the epoxy-functional compound is a silicon containing epoxy-functional compound, similarity in chemical structure, with that of the crosslinkable organosilicon prepolymer of the invention, militates against such a miscibility problem.

Consistent with the foregoing, mixing is especially facilitated, where the silicon substituent, of the silicon containing epoxy-functional compound, is provided by linear and/or cyclic polysiloxane and/or tetrahedral siloxane, and the crosslinkable prepolymer is correspondingly derived from linear and/or cyclic polysiloxane. In such instance, the particular closeness in chemical structure, deriving from the siloxane functionality of both, particularly negates immiscibility, as a factor limiting the relative amounts of epoxy-functional compound and prepolymer which can be used together.

Therefore, for silicon containing epoxy-functional compound—particularly, as indicated, where the silicon substituent thereof is provided by linear and/or cyclic polysiloxane, and the crosslinkable prepolymer is correspondingly derived from linear and/or cyclic polysiloxane—any relative proportions of epoxy-functional compound and crosslinkable prepolymer, for obtaining the desired properties of curable blend and/or cured product, can be employed in the blend. For instance, epoxy-functional compound can comprise anywhere from 1% to 99%, and prepolymer can likewise comprise from 1% to 99%, by weight of the epoxy-functional compound/prepolymer total.

However, it is generally the case, with respect to epoxy-functional compounds other than the previously-discussed silicon containing epoxy-functional compounds, that the amount of epoxy-functional compound which can be used, relative to prepolymer, is restricted by the limited miscibility between such two components. This limited miscibility results from the difference in chemical structure, between the epoxy-functional compound and prepolymer; accordingly, if excessive epoxy-functional compound is used, thorough mixing may not be effected, and the epoxy-functional compound and prepolymer will split into layers.

Taking this factor into account, such epoxy-functional compound is preferably limited to an amount within the range of 5%, or about 5%, to 30%, or about 30%, of the epoxy-functional compound/prepolymer total. More preferably, the range is 10%, or about 10%, to 20%, or about 20%.

With regard to the reactions which occur during curing, the structure of the ensuing product, and the identity of its components, the following discussion—particularly as to the activity of the epoxy-functional compound, curing agent, and curing accelerator, the placement of such epoxy-functional compound and curing agent in the product structure, the configuration of multiple polymers in interwoven relationship, and the composition of such polymers—is provided according to the best understanding of these matters at the present. Such discussion is not intended to limit the scope of the invention.

Curing, in the presence of hydrosilation catalyst, effects hydrosilation of available carbon-carbon double bonds and $\equiv$SiH groups. For instance, where polyene and silicon compound, or polyene and partially epoxy-substituted silicon compound, are included among the starting materials— e.g., as per the previously discussed first and third embodiments—the reaction will proceed through, if continued for a sufficient amount of time, to the crosslinked polymer; correspondingly, where it is the crosslinkable prepolymer which is employed e.g., as per the previously discussed fourth embodiment—it is the as yet unreacted carbon-carbon double bonds and $\equiv$SiH groups thereof which undergo hydrosilation, with the result being further conversion, of the prepolymer, to a crosslinked polymer.

Additionally during curing, the hydrosilation catalyst, and $\equiv$SiH groups provided by silicon compound, and/or crosslinkable prepolymer, and/or crosslinked polymer, together provide a catalyst system for catalyzing yet another reaction—i.e., ring opening polymerization of the epoxy-functional compound—if, as previously discussed, there is sufficient of both $\equiv$SiH groups and hydrosilation catalyst present for this purpose, and likewise enough epoxy functionality to support such polymerization. Moreover, regardless of the presence of sufficient of the indicated cocatalysts, such ring opening polymerization will still occur, if enough curing agent, and optionally, curing accelerator, are present.

Where hydrosilation and ring opening polymerization do, indeed thusly simultaneously occur during the curing procedure—as otherwise discussed above, with respect to the first, third, and fourth embodiments—the resulting cured composition accordingly apparently comprises at least two polymers—i.e., the crosslinked polymer, and the ring opening polymerization product—permanently interwoven. Further characteristics, of the cured product, are thought to depend upon certain features of the blend components.

For instance, if the epoxy-functional compound, besides being ring opening polymerizable, is not also reactive with the forming crosslinked polymer—or the components from which it is prepared—then no covalent bonds will form between such epoxy-functional compound and polymer; it accordingly appears that the resulting cured product will be an interpenetrating polymer network—i.e., with the plurality of polymers being only permanently interwoven, and not also linked. Such appears to be the result when the epoxy-functional compound is any one or more of, for instance, 3,4-epoxycyclohexylmethyl- 3,4-epoxycyclohexylcarboxylate, bis(3,4 -epoxycyclohexyl)adipate, tetraglycidyl methylene dianiline, glycidyl ether of bisphenol A, 1,3-bis(3,4-epoxycyclohexlethyl)tetramethyldisiloxane (BTMDS), and 1,3,5,7-tetramethyltetrakis( 3,4-epoxycyclohexlethyl)cyclotetrasiloxane ($D^{VHCO}_4$), or a copolymer of glycidyl ether phenol and DCPD.

However, where the epoxy-functional compound is provided with one or more hydrosilation-reactive carbon-carbon double bonds—such as is the case, for instance, with vinylcyclohexene monoxide, and limonene oxide—it appears that curing will result in the reaction of $\equiv$SiH functionality therewith, as well as the reaction, of such $\equiv$SiH functionality, with polyene carbon-carbon double bonds. With the previously discussed ring opening polymerization also taking place during curing, it further appears that the product will accordingly feature, not only the indicated plurality of polymers, permanently interwoven, but also covalent bonding between such polymer resulting from ring opening polymerization, and the crosslinked polymer, derived from the crosslinkable prepolymer and/or polyene and silicon compound.

The ultimate structure, and other properties, of the cured composition, appear also to be affected by such factors as whether additional components—besides, e.g., polyene, silicon compound, prepolymer, and epoxy-functional compound are present in the curable blend, as well as what particular combinations of such additional components are utilized. For instance, the previously discussed presence of curing agent, during ring opening polymerization, can apparently affect what polymerization occurs—depending, e.g., upon what curing agent is employed, and upon whether curing accelerator is also present.

Specifically, where ring-opening polymerization is occurring, but no additional component (e.g., curing agent), capable of polymerizing with the epoxy-functional compound, is present during such ring opening polymerization, then what takes place during such polymerization appears to be only homopolymerization of the epoxy-functional compound, to provide a polyether. In such instance, it further appears that, if polyene is likewise present, there will accordingly be two interwoven polymers in the cured composition—i.e., the crosslinked polymer, and such polyether.

Of course, if two or more epoxy-functional compounds are employed, then it appears that the ring opening polymerization of epoxy-functional compound is therefore not, strictly speaking, a homopolymerization, while if the epoxy-functional compound also has at least one hydrosilation reactive carbon-carbon double bond, as discussed above, then it appears that the indicated covalent bonding between polymers also takes place. In any event, the polyether would still be provided.

As noted, curing agent is a component whose presence appears to influence the structure of the cured composition. Whether there is indeed any such effect, and what that effect is, appears to depend upon the reactivity of such curing agent, relative to the epoxy-functional compound, in the polymerization, and—if curing accelerator affects this reactivity—upon whether curing accelerator is thusly present.

For instance, where the curing agent employed is only of a certain degree of reactivity—that is, in comparison with the epoxy-functional compound—then it appears that multiple polymerizations occur simultaneously; e.g., both epoxy resin homopolymer, and copolymer of epoxy resin and curing agent, appear to be provided. There will apparently accordingly be three interwoven polymers in the cured composition—i.e., the crosslinked polymer, such homopolymer, and such copolymer.

This appears to be the case where the curing agent used with the epoxy resin is a polycarboxylic anhydride. The epoxy resin apparently both homopolymerizes, to provide a polyether, and copolymerizes with polycarboxylic anhydride, to provide a polyester.

However, for such a curing agent of comparatively lesser reactivity, it appears that the additional presence of curing accelerator can enhance such curing agent's capacity—relative to that of the epoxy resin—for participating in the ring opening polymerization, thereby diminishing the degree of homopolymerization occurring, and correspondingly increasing the degree of copolymerization. If the curing accelerator has sufficient such effect, it appears that its presence can even result in the exclusion, or at least substantial exclusion, of homopolymerization, in favor of the copolymerization. Under the premise that the polymerizations appearing to occur are actually occurring, then, without the polyether which apparently would otherwise have formed, there will be only two interwoven polymers in the cured product.

This appears to be the case where such polycarboxylic anhydride is the curing agent, and an accelerator is employed. It appears that ring opening polymerization results in the polyester, to the exclusion, or at least substantial exclusion, of the polyether.

However, where the curing agent is sufficiently reactive by itself, apparently to compete successfully, with epoxy resin, in the ring opening polymerization thereof, then no curing accelerator is necessary to limit, or even prevent, what appears to be the competing homopolymerization of the epoxy resin, and thereby apparently provide a cured product with two interwoven polymers. This is the case with amine curing agents, whose use will apparently result in a polyamine/polyol copolymerization product, to the exclusion of the polyether homopolymerization product.

The compositions of this invention have utility for electronic applications, e.g., composites, adhesives, encapsulants, potting compounds, and coatings. They are especially useful for the preparation of prepregs and laminates such as those used for printed circuit boards, and glob top encapsulants and molding compounds for encapsulation.

For preparing prepregs and laminates, utilizing compositions of the invention, the procedures as disclosed in BARD et al. '360, in U.S. application Ser. No. 593,168, now abandoned, and in U.S. application Ser. No. 764,829, U.S. Pat. No. 5,390,644, filed on Sep. 24, 1991, may be employed. This latter application is incorporated herein in its entirety, by reference thereto.

With respect to preparation of prepregs, utilizing curable blends of the invention provided with prepolymer as a starting material, a suitable procedure includes forming the prepreg by impregnating reinforcement fibers (e.g., glass fabric) with the curable blend, or pouring the curable blend over such reinforcement. Then, preferably, the thusly treated reinforcement is cured to the point where the blend of the invention is substantially solid, and, most preferably, also at least substantially tack free; however, prepregs thusly obtained, but which are not tack free, are also within the scope of the invention.

Where the curable blend of the invention utilizes polyene and silicon compound—instead of, or in addition to, prepolymer prepared therefrom, as discussed above—in such preparation, then this blend is first partially cured, to obtain a liquid (preferably viscous), semisolid, or solid composition. It is this composition which is thusly employed with the reinforcement, with prepreg preparation otherwise being effected according to the procedure set forth above.

In a suitable procedure for obtaining laminates, individual plies of prepregs are stacked, and laminated under heat and pressure, in a hydraulic press. Further cure, of the blend of the invention, is obtained in this treatment.

The invention is illustrated by the following Examples, which are provided for the purpose of representation, and are not to be construed as limiting the scope of the invention. Unless stated otherwise, all percentages, parts, etc. are by weight.

EXPERIMENTAL PROCEDURE

Preparation of Crosslinkable Prepolymer

The prepolymer utilized in Examples 1–20 and 23–45 was prepared according to the following procedure.

60.0 g (1.0 mol of $\equiv$SiH) MHCS, 20 ml of toluene, and 119 μl (7.5 ppm platinum) of PC072 platinum catalyst (Huls America), were placed in a three-necked 500 ml round bottomed flask, equipped with a condenser and a dropping funnel, and preheated therein to 70° C. To this preheated mixture, a mixture of 66 g of DCPD (1.0 mol of C=C), and 131 μl (7.5 ppm platinum) of PC072 platinum catalyst, was added dropwise through the dropping funnel, thereby providing a ratio of 1:1, for the hydrosilation reactive $\equiv$SiH groups provided by the MHCS, to the hydrosilation reactive carbon-carbon double bonds provided by the DCPD; during the addition of the DCPD-catalyst mixture, temperature was maintained within a range of 85° to 90° C., by adjusting addition speed.

After addition of the DCPD-catalyst mixture was completed, temperature was maintained at 70° C. for one hour, then allowed to cool to room temperature. After such cooling, 6.63 g of an antioxidant composition—comprising a 38% by weight solution of 5/1 w/w Naugard™ 76/Tinuvin™ 765, in toluene—was added to the mixture.

The prepolymer utilized in Examples 21 and 22 was prepared in the manner as set forth above, except with 50.0 g (0.83 mol of $\equiv$SiH) MHCS, and 50.0 g (0.76 mol of C=C) DCPD thereby providing a 1.1:1 ratio weighted in favor of the $\equiv$SiH groups, in contrast to the previously discussed 1:1 ratio, and resulting in a $\equiv$SiH rich prepolymer. The molar ratio of olefin to $\equiv$SiH was thusly adjusted to compensate for the hydrosilation reactive carbon-carbon double bonds provided by the limonene oxide of Example 21, and by the vinylcyclohexene monoxide of Example 22. The hydrosilation reactive carbon-carbon double bonds provided by each of these epoxy-functional compounds raised the total olefin/$\equiv$SiH ratio to 1:1, in both Examples.

Preparation of 1,3-bis(3,4-epoxycyclohexylethyl)tetramethyldisiloxane (BTMDS)

66.0 g of vinylcyclohexene monoxide (VCHO, 0.53 mol) and 20 mg of tris(triphenylphosphine)rhodium chloride were placed in a three-necked 250 ml round bottom flask, equipped with a condenser and a dropping funnel. The flask was then heated to 80° C., after which 33.6 g of 1,1,3,3-tetramethyldisiloxane (0.25 mol) was added dropwise through the dropping funnel; during such addition, the temperature was maintained at 80° C., by adjusting the addition speed. After completion of the 1,1,3,3-tetramethyldisiloxane addition, the reaction mixture was maintained at 40° C. for two hours, by means of an oil bath, then cooled to room temperature. Vacuum distillation of the reaction mixture, to remove excess VCHO, was carried out using a Kugelrohr apparatus, at 60° C., and a vacuum of 1 mm Hg. The product, BTMDS (91.0 g, 95%), was collected.

Preparation of 1,3,5,7-tetramethyl-tetrakis(3,4-epoxycyclohexylethyl)cyclotetrasiloxane ($D^{VCHO}_4$)

A solution of 16.0 g of 1,3,5,7-tetramethylcyclotetrasiloxane ($D'_4$, 0.067 mol), in 100 ml of toluene, was placed in a three necked round bottom flask equipped with a condenser, a Dean-Stark trap containing calcium hydride, a drying tube, and a dropping funnel. The solution was refluxed for 1.5 hours, then cooled to 30° C. First, 41.0 g of vinylcyclohexene monoxide (VCHO, 0.33 mol), then 200 μl (30 ppm platinum) of PC072 platinum catalyst (Huls America), were added in through a syringe. Reaction temperature was maintained below 60° C., by means of an external ice bath; when the temperature dropped to room temperature, an oil bath was used to heat the reaction mixture to 40° C., for 1.5 hours. Vacuum distillation of the reaction mixture, to remove excess VCHO, was carried out using a Kugelrohr apparatus, at 60° C., and a vacuum of 1 mm Hg. The product, $D^{VCHO}_4$ (47.1 g, 96%), was collected.

Preparation of the Hydrosilation Product of PS123.5 Methylhydrodimethylsiloxane Copolymer and Vinylcyclohexene Monoxide (PS123.5-VHCO)

A solution 45.9 g of methylhydrodimethylsiloxane copolymer (PS123.5) and 0.012 g of tris(triphenylphosphine)rhodium chloride, in 20 ml of toluene, was placed in a three-necked 500 ml round bottom flask, equipped with a condenser and a dropping funnel. The solution was heated to 70° C., after which 15.0 g of vinylcyclohexene monoxide (VHCO) was added dropwise through the dropping funnel. After addition of the VHCO was completed, the solution was kept at 70° C. for two hours, at the end of which time, the solvent was removed by a rotovap. Then, vacuum distillation of the reaction mixture, to remove excess VCHO, was carried out using a Kugelrohr apparatus, at 50° C., and a vacuum of 1 mm Hg. The product, PS123.5-VHCO (56.7 g, 93%), was collected.

Preparation of the Hydrosilation Product of PS129.5 Methylhydrophenylmethylsiloxane Copolymer and Vinylcyclohexene Monoxide/PS129.5-VHCO)

A solution 50.0 g of methylhydrophenylmethylsiloxane copolymer (PS129.5) and 0.022 g of tris(triphenylphosphine)rhodium chloride, in 20 ml of toluene, was placed in a three-necked 500 ml round bottom flask, equipped with a condenser and a dropping funnel. The solution was heated to 80° C., after which 34.6 g of vinylcyclohexene monoxide (VHCO) was added dropwise through the dropping funnel. After addition of the VHCO was completed, the solution was kept at 85–90° C. for four hours, then heated to reflux at 110° for eight hours, after which the solvent was removed by a rotovap. Then, vacuum distillation of the reaction mixture, to remove excess VCHO, was carried out using a Kugelrohr apparatus, at 50° C., and a vacuum of 1 mm Hg. The product, PS129.5-VHCO (43.8 g, 36.5%), was collected.

Preparation of Cured Composition

Crosslinkable prepolymer and epoxy-functional compound—and, for certain Examples, as indicated below, also curing agent, and, for certain other Examples, yet additionally curing accelerator—were mixed together to form blends; depending upon the Example, either additional catalyst was added to such blend, or curing was effected simply with the catalyst remaining in the prepolymer, from its preparation. These blends were poured into the top slot of 5"×5"×⅛" teflon lined steel molds, and placed under an aspirator vacuum in an oven, to remove air from the blends. The molds were heated in an oven, under cure cycles as specified in the Examples, to provide curing.

Measurements of Properties

As to the data provided hereinafter, dynamic modulus was measured in a Rheometrics Dynamics Spectrometer Model 7700 (Rheometrics Inc., Piscataway, N.J.). A temperature sweep was carried out at a fixed frequency of 10 radians/second.

Thermogravimetric analysis was carried out in a DuPont Thermal Analyzer (E. I. DuPont de Nemours & Company, Inc., Wilmington, Del.) at 20° C./minute.

Thermal Mechanical Analysis and Thermal Expansion Coefficient were measured using a DuPont Thermomechanical Analyzer with a 100 mg load, and expansion probe at 10° C./minute.

The following Examples 1–22 concern preparation of cured compositions from the crosslinkable prepolymer and epoxy-functional compound, without the additional presence of curing agent or curing accelerator; for each of these Examples, the cure cycle was 170° C., 1 hour; 250° C., 4 hours. With respect to Example 10, additional PC072 catalyst, in an amount of 40 ppm of the blend, was added; no such additional catalyst was provided in the remaining Examples 1–9 and 11–22.

| Example | Epoxy-Functional Compound | Prepolymer/Epoxy-Functional Compound (wt. in g.) | Tg (TMA, °C.) | CTE (ppm/°C.) 60–100° C. | CTE (ppm/°C.) 30–246° C. | RDS Tg (°C.) | RDS G' @ 22° C. (dyne/cm$^2$) | TGA (1000° C. N$_2$, wt % of residue) |
|---|---|---|---|---|---|---|---|---|
| 1 | BTMDS | 13.5/1.5 | not observed | 110 | 125 | 192 | $1.013 \times 10^{10}$ | 44.3 |
| 2 | BTMDS | 12.0/3.0 | 125 | 135 | 147 | — | — | — |
| 3 | BTMDS | 10.5/4.5 | 154 | 157 | 167 | — | — | 33.6 |
| 4 | CY179 | 13.5/1.5 | not observed | 120 | 131 | — | — | 48.1 |
| 5 | CY179 | 12.0/3.0 | 124 | 133 | 153 | 167 | $8.35 \times 10^9$ | 38.5 |
| 6 | CY179 | 10.5/4.5 | 122.6 | 148 | 165 | — | — | 34.7 |
| 7 | DER332 | 12.0/3.0 | not observed | 110 | 117 | −15, 185 | $8.76 \times 10^9$ | 46.1 |
| 8 | D$_4^{VCHO}$ | 9.0/1.0 | — | — | — | — | — | — |
| 9 | Tactix 556 | 18.0/2.0 | 150 | 100 | 120 | — | — | — |
| 10 | Tactix 556 | 14.0/6.0 | 99.7 | 95.7 | 107 | — | — | — |
| 11 | ERL 4206 | 18.0/2.0 | — | — | — | — | — | — |
| 12 | ERL 4299 | 18.0/2.0 | 238 | 115 | 130 | — | — | 49.4 |
| 13 | ERL 4299 | 14.0/6.0 | 118.3 | 154 | 173 | — | — | 40.1 |
| 14 | PS123.5-VCHO | 9.0/1.0 | 136.2 | 102 | 151 | — | — | 43.2 |
| 15 | PS123.5-VCHO | 12.0/3.0 | 162.5 | 130 | 161 | — | — | 41.3 |
| 16 | PS129.5-VCHO | 9.0/1.0 | 123.6 | 111 | 150 | — | — | 51.3 |
| 17 | PS129.5-VCHO | 12.0/3.0 | 187.3 | 122 | 143 | — | — | 40.8 |
| 18 | PS129.5-VCHO | 10.5/4.5 | not observed | 140 | 154 | — | — | 37.0 |
| 19 | ERL 4234 | 13.5/1.5 | 148 | 103 | 123 | — | — | 44.5 |
| 20 | DEN 431 | 13.5/1.5 | 142.2 | 107 | 149 | — | — | 52.3 |
| 21 | Limonene Oxide | 15.0/1.7 | 161.2 | 106 | 143 | — | — | 45.0 |
| 22 | VCHO | 15.0/1.4 | 165.0 | 108 | 142 | — | — | 48.0 |

The following Examples 23–37 include epoxy resin curing agent, in addition to the crosslinkable prepolymer and epoxy resin.

EXAMPLE 23

23.75 g of prepolymer was mixed with 1.25 g of an epoxy formulation—including 0.78 g of tetraglycidyl methylenedianiline as the epoxy-functional compound, and 0.47 g of 4-aminophenyl sulfone as the curing agent, in a 1:1 molar ratio—and with 0.061 g (24 ppm of the blend) of PCO75 platinum catalyst (Huls America). This blend, thusly comprising 95% by weight of the prepolymer, and 5% by weight of the epoxy formulation, was cured in two cycles.

The first cure cycle was 125° C., 2 hours; 150° C., 4 hours; 200° C., 2 hours. The second cure cycle was 250° C., 2 hours.

The properties of the resulting cured composition are set forth below, in comparison with corresponding properties of a cured composition prepared from the prepolymer alone, without epoxy-functional compound or curing agent.

| Examples | Max. cure Temp. (°C.) | RDS Analysis Tg(C.°) | RDS Analysis G'(dyne/cm$^2$) | TGA % residue @ 1000° C./N$_2$ |
|---|---|---|---|---|
| 23 | 150 | 156 | $1.07 \times 10^{10}$ | 51.4 |
|  | 250 | 224 | $9.7 \times 10^{9}$ |  |
| MHCS/DCPD alone (comparative) | 150 | 163 | $9.4 \times 10^{9}$ | 51.2 |
|  | 250 | 198 | $9.0 \times 10^{9}$ |  |

The foregoing data indicate that the presence of a mere 5% by wt. epoxy formulation, in the cured composition of Example 23, results in a higher glass transition temperature, and also a higher complex modulus—as determined by dynamic mechanical analysis—than are found in the cured composition prepared without such epoxy resin and curing agent.

EXAMPLE 24

18.0 g of prepolymer, containing 20 ppm of PC072 platinum catalyst (Huls America), was mixed with 1.1 g of EEL 4299 (Union Carbide) and 0.9 g of MHHPA (Anhydrides and Chemicals Inc.). This blend was cured according to the following cure cycle: 170° C., 1 hour; 250° C., 4 hours. The resulting product was found to have the properties as set forth below.

| Tg (°C.) (TMA) | CTE (ppm/°C.) 60–100° C. | CTE (ppm/°C.) 30–246° C. | RDS Analysis Tg (°C.) | RDS Analysis G' (dyne/cm$^2$) @ 22° C. | TGA (% residue @ 1000° C. under N$_2$) |
|---|---|---|---|---|---|
| 180.3 | 97.5 | 127 | 220 | $1.03 \times 10^{10}$ | 48.7 |

In each of Examples 25–37, the curable blend contained 60 ppm of PC072 platinum catalyst, and was thermally cured at 170° C., for one hour, then postcured at 250° C., for four hours. The identities of epoxy resins and curing agents used in the curable blends, and the amounts of prepolymer, epoxy-functional compound, and curing agent, as well as the properties of the resulting cured compositions, are set forth below.

| Example | Epoxy-Functional Compound | Curing Agent | Prepolymer/ Epoxy-Functional Compound Curing Agent (wt. in g) | Tg (TMA) | CTE (ppm/°C.) 60–100° C. | CTE (ppm/°C.) 30–246° C. | Sample Description |
|---|---|---|---|---|---|---|---|
| 25 | Tactix 556 | MHHPA | 18.0/1.32/0.68 | not observed | 94.6 | 117 | cured |
| 26 | ERL 4206 | MHHPA | 18.0/1.32/0.68 | not observed | 98.2 | 129 | cured, transparent |
| 27 | ERL 4299 | MHHPA | 15.0/2.4/1.4 | 92.9 | 104 | 132 | cured, voids |
| 28 | Tactix 556 | MHHPA | 15.0/2.5/1.3 | 98.9 | 99.8 | 137 | opaque, some voids |
| 29 | PS123.5-VCHO | MHHPA | 13.5/1.13/0.38 | 160.0 | 109 | 148 | opaque, white |
| 30 | PS129.5-VCHO | MHHPA | 9.4/0.6/0.4 | 160.4 | 109 | 137 | hazy |
| 31 | PS129.5-VCHO | MHHPA | 13.2/1.8/1.2 | 146.0 | 114 | 149 | transparent, some voids |
| 32 | DFM32 | Ancamide 400 | 13.5/1.5/0.75 | * | * | * | cured, foaming |
| 33 | DER332 | AEP | 13.5/1.5/0.75 | * | * | * | cured, foaming |
| 34 | DER332 | Ancamide 506 | 18.0/1.25/0.75 | * | * | * | cured, voids |
| 35 | DER332 | BF$_3$.DMA | 13.5/1.5/0.75 | 117.6 | 128 | 171 | cured |
| 36 | DER332 | 4,4'-DDS | 118.0/1.5/0.75 | not observed | 100 | 116 | cured, white opaque |
| 37 | DER332 | HRJ2210 | 12.0/2.25/0.75 | 79.9 & 195.5 | 105 | 134 | opaque, yellow |

*Sample in unsuitable for thermomechanical analysis (TMA) due to too many voids.

The following Examples 38–45 include both curing agent and curing accelerator, in addition to the crosslinkable prepolymer and epoxy resin.

EXAMPLE 38

16.0 g of prepolymer was mixed with 2.3 g of DER 332 (Dow), 1.7 g of MHHPA (Anhydrides and Chemicals Inc.), 0.1 g of DMBA, and 60 ppm of PC072 platinum catalyst (Huls America). This blend was cured according to the following cure cycle: 170° C., 1 hour; 250° C., 4 hours. The resulting product was found to have the properties as set forth below.

| Tg (C.°) (TMA) | CTE (ppm/°C.) 60–100° C. | CTE (ppm/°C.) 30–246° C. | RDS Analysis Tg (°C.) | RDS Analysis G' (dyne/cm²) @ 22° C. | TGA (% residue @ 1000° C. under N₂) |
|---|---|---|---|---|---|
| 147 | 88.0 | 129.0 | 132, 190° C. | $1.173 \times 10^{10}$ | 49.4 |

In each of Examples 39–45, the curable blend contained 60 ppm of PC072 platinum catalyst, and was thermally cured at 170° C., for one hour, then postcured at 250° C., for four hours. The identities of epoxy-functional compounds, curing agents, and curing accelerators used in the curable blends, and the amounts of prepolymer, epoxy-functional compound, curing agent, and curing accelerator, as well as the properties of the resulting cured compositions, are set forth below.

| Example | Epoxy-Functional Compound | Curing Agent | Curing Accelerator | Polymer/Epoxy-Functional Compound/Curing Agent/Curing Accelerator (wt. in g) | Tg (TMA) | CTE (ppm/°C.) 60–100° C. | CTE (ppm/°C.) 30–246° C. | Sample Description |
|---|---|---|---|---|---|---|---|---|
| 39 | BTMDS | MHHPA | DMBA | 14.0/3.6/2.4/0.06 | * | * | * | cured, transparent, microcracks |
| 40 | ERL 4206 | MHHPA | DMBA | 18.0/1.32/0.68/0.02 | 145.8 | 105 | 143 | cured, transparent |
| 41 | ERL 4299 | MHHPA | DMBA | 15.0/1.05/0.65/0.17 | not observed | 100 | 121 | cured, hazy, voids |
| 42 | Tactix 556 | MHHPA | DMBA | 15.0/1.1/0.6/0.08 | 131.4 | 99.7 | 148.0 | pale brown, hazy |
| 43 | PS123.5-VCHO | MHHPA | DMBA | 13.5/1.13/0.38/0.15 | 125.6 | 118 | 167 | opaque, white to tan |
| 44 | PS129.5-VCHO | MHHPA | DMBA | 14.1/0.9/0.6/0.15 | 122.5 | 112 | 158 | transparent, some voids |
| 45 | PS129.5-VCHO | MHHPA | DMBA | 12.0/1.8/1.2/0.15 | 64.0 | 123 | 217 | transparent |

*Sample is unsuitable for thermomechanical analysis (TMA) due to too many voids.

Finally, although the invention has been described with reference to particular means, materials and embodiments, it should be noted that the invention is not limited to the particulars disclosed, and extends to all equivalents within the scope of the claims.

What is claimed is:

1. A curable composition comprising:
   (a) a silicon compound, having at least three hydrosilation reactive ≡SiH groups, and comprising at least one member selected from the group consisting of cyclic polysiloxanes, tetrahedral siloxysilanes, and linear polysiloxanes;
   (b) an epoxy-functional compound comprising at least one hydrosilation reactive carbon-carbon double bond; and
   (c) a curing agent, wherein the curing agent is selected from the group consisting of anhydrides, amines and polyols.

2. The curable composition of claim 1, further comprising a hydrosilation catalyst.

3. The curable composition of claim 1, wherein the silicon compound comprises at least one member selected from the group consisting of:

(a) cyclic polysiloxanes having the formula:

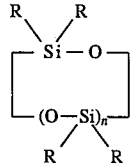

wherein R, which can be the stone or different, is hydrogen, or a saturated, substituted, or unsubstituted alkyl or alkoxy radical, or a substituted or unsubstituted aromatic or aryloxy radical, n is an integer from 2 to about 20, and R is hydrogen on at least two of the silicon atoms;

(b) tetrahedral siloxysilanes having the formula:

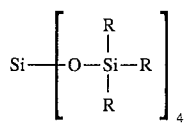

wherein R is as defined above, and is hydrogen on at least two silicon atoms in the molecule; and (c) linear polysiloxanes having the formula:

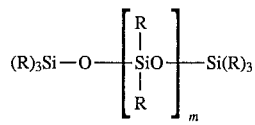

wherein R, which can be the stone or different, is hydrogen, or a substituted or unsubstituted saturated alkyl radical, or a substituted or unsubstituted phenyl radical, at least two R's are hydrogen, and m is an integer from about 0 to 1000; and wherein the curable composition comprises a sufficient amount, of the epoxy-functional compound for at least substantially complete hydrosilation of the silicon compound hydrosilation reactive ≡SiH groups.

4. The curable composition of claim 3, wherein:

(a) the silicon compound comprises a plurality of methylhydrocyclosiloxanes; and (b) the epoxy-functional compound is selected from the group consisting of vinyl cyclohexene monoxide and allyl glycidyl ether.

5. The curable composition of claim 1, further comprising a curing accelerator.

6. A cured composition, resulting from subjecting the curable composition of claim 1 to conditions suitable for:

(a) effecting hydrosilation of (i) the silicon compound, and (ii) the epoxy-functional compound; and (b) effecting ring opening polymerization of an epoxy functionality of the epoxy-functional compound.

7. A curable composition comprising:

(a) an epoxy-substituted silicon compound, comprising the hydrosilation reaction product of reactants comprising the following:

(i) a silicon compound, having at least three hydrosilation reactive ≡SiH groups, and comprising at least one member selected from the group consisting of cyclic polysiloxanes, tetrahedral siloxysilanes, and linear polysiloxanes; and (ii) An epoxy functional compound comprising at least one hydrosilation reactive carbon-carbon double bond; and (b) a curing agent.

8. The curable composition of claim 1, wherein the curing agent comprises an anhydride.

9. The curable composition of claim 8, wherein the curing agent comprises a polycarboxylic anhydride.

10. The curable composition of claim 8, wherein the polycarboxylic anhydride is selected from the group consisting of nadic anhydride (NA), methylnadic anhydride (MNA), phthalic anhydride, tetrahydrophthalic anhydride, hexahydrophthalic anhydride (HHPA), methyltetrahydrophthalic anhydride (MTHPA), methylhexahydrophthalic anhydride (MHHPA), endomethylene-tetrahydrophthalic anhydride, hexachloroendomethylenetetra-hydrophthalic anhydride, trimellitic anhydride, pyromellitic dianhydride, maleic anhydride (MA), succinic anhydride (SA), nonenylsuccinic anhydride, dodecenylsuccinic anhydride (DDSA), polysebacic polyanhydride, and polyazelaic polyanhydride.

11. The curable composition of claim 1, wherein the curing agent comprises an amine.

12. The curable composition of claim 8, wherein the amine is selected from the group consisting of 1,4-cyclohexane-bis(methylamine), 1,3-bis(3-aminopropyl)tetra-methyldisiloxane, hexamethylenediamine, triethylenetetraamine, N-aminoethyl piperazine (AEP), 1,3-diaminobenzene, 1,4-diaminobenzene and 4,4'-diaminodiphenylmethane.

13. The curable composition of claim 1, wherein the amine comprises a polyaminosulfone.

14. The curable composition of claim 13, wherein the polyaminosulfone is selected from the group consisting of 4,4'-diaminodiphenyl sulfone (4,4'-DDS), 4-aminophenyl sulfone, and 3-aminophenyl sulfone.

15. The curable composition of claim 1, wherein the curing agent comprises a polyol.

16. The curable composition of claim 15, wherein the polyol is selected from the group consisting of ethylene glycol (EG), poly(propylene glycol), and poly(vinyl alcohol) and phenolformaldehyde resin.

17. A process of preparing a cured composition, from a blend comprising:

(a) a silicon compound, having at least three hydrosilation reactive ≡SiH groups, and comprising at least one member selected from the group consisting of cyclic polysiloxanes, tetrahedral siloxysilanes, and linear polysiloxanes;

(b) an epoxy-functional compound comprising at least one hydrosilation reactive carbon-carbon double bond;

(c) a curing agent, wherein the curing agent is selected from the group consisting of anhydrides, amines and polyols; and (d) a hydrosilation catalyst;

the process comprising subjecting the blend to conditions suitable for (i) effecting hydrosilation of the silicon compound, and the epoxy-functional compound, and for (ii) effecting ring opening polymerization of an epoxy functionality of the epoxy-functional compound.

18. The process of claim 17, wherein:

(a) the silicon compound comprises a plurality of methylhydrocyclosiloxanes; and (b) the epoxy-functional compound, comprises a member selected from the group consisting of vinyl cyclohexene monoxide and allyl glycidyl ether;

the blend comprising a sufficient amount, of the epoxy-functional compound for at least substantially complete hydrosilation of the silicon compound hydrosilation reactive ≡SiH groups.

19. The process of claim 17, wherein the blend further comprises a curing accelerator.

20. The process of preparing a cured composition of claim 17, wherein the curing agent comprises an anhydride.

21. The process of preparing a cured composition of claim 20, wherein the curing agent comprises a polycarboxylic anhydride.

22. The process of preparing a cured composition of claim 21, wherein the polycarboxylic anhydride is selected from the group consisting of nadic anhydride (NA), methylnadic anhydride (MNA), phthalic anhydride, tetrahydrophthalic anhydride, hexahydrophthalic anhydride (HHPA), methyltetrahydrophthalic anhydride (MTHPA), methylhexahydrophthalic anhydride (MHHPA), endomethylene-tetrahydrophthalic anhydride, hexachloroendomethylenetetrahydrophthalic anhydride, trimellitic anhydride, pyromellitic dianhydride, maleic anhydride (MA), succinic anhydride (SA), nonenylsuccinic anhydride, dodecenylsuccinic anhydride (DDSA), polysebacic polyanhydride, and polyazelaic polyanhydride.

23. The process of preparing a cured composition of claim 17, wherein the curing agent comprises an amine.

24. The process of preparing a cured composition of claim 23, wherein the amine is selected from the group consisting of 1,4-cyclohexane-bis(methylamine), 1,3-bis(3-aminopropyl)tetramethyldisiloxane, hexamethylenediamine, triethylenetetraamine, N-aminoethyl piperazine (AEP), 1,3-diaminobenzene, 1,4-diaminobenzene and 4,4'-diaminodiphenylmethane.

25. The process of preparing a cured curable composition of claim 23, wherein the amine comprises a polyaminosulfone.

26. The process of preparing a cured composition of claim 25, wherein the polyaminosulfone is selected from the group consisting of 4,4'-diaminodiphenyl sulfone (4,4'-DDS), 4-aminophenyl sulfone, and 3-aminophenyl sulfone.

27. The process of preparing a cured composition of claim 17, wherein the curing agent comprises a polyol.

28. The process of preparing a cured composition of claim 27, wherein the polyol is selected from the group consisting of ethylene glycol (EG), poly(propylene glycol), and poly(vinyl alcohol) and phenol-formaldehyde resin.

* * * * *

UNITED STATES PATENT AND TRADEMARK OFFICE
CERTIFICATE OF CORRECTION

PATENT NO. : 5,523,374

DATED : June 4, 1996

INVENTOR(S) : John K. Bard, Richard L. Brady, Raymond T. Leibfried and De K. Loo It is certified that error appears in the above-identified patent and that said Letters Patent is hereby corrected as shown below:

In column 30, line 61, delete "stone" and replace it with --same--.

In column 31, line 18, delete "stone" and replace it with --same--.

Signed and Sealed this

Tenth Day of September, 1996

Attest:

BRUCE LEHMAN

Attesting Officer     Commissioner of Patents and Trademarks